(12) United States Patent
Brown et al.

(10) Patent No.: US 6,603,838 B1
(45) Date of Patent: Aug. 5, 2003

(54) VOICE MESSAGING SYSTEM WITH SELECTED MESSAGES NOT LEFT BY A CALLER

(75) Inventors: Wendell Brown, Las Vegas, NV (US); Mark D. Klein, Los Altos, CA (US); Edgar Allan Tu, Castro Valley, CA (US)

(73) Assignee: America Online Incorporated, Dulles, VA (US)

( * ) Notice: Subject to any disclaimer, the term of this patent is extended or adjusted under 35 U.S.C. 154(b) by 162 days.

(21) Appl. No.: 09/584,242

(22) Filed: May 31, 2000

Related U.S. Application Data

(60) Provisional application No. 60/136,906, filed on Jun. 1, 1999.

(51) Int. Cl.[7] .................................................. H04M 1/64
(52) U.S. Cl. ....................................... 379/88.22; 379/63
(58) Field of Search ..................... 379/67.1, 68, 88.19, 379/71, 72, 88.2, 88.21, 88.22, 88.23, 88.24, 88.25, 912, 917; 455/412, 413, 414, 415

(56) References Cited

U.S. PATENT DOCUMENTS

| | | | |
|---|---|---|---|
| 4,389,546 A | | 6/1983 | Glisson et al. ............. 179/18 B |
| 4,850,007 A | * | 7/1989 | Marino et al. ........... 379/114.13 |
| 4,932,042 A | * | 6/1990 | Baral et al. ................. 379/67.1 |
| 5,113,430 A | | 5/1992 | Richardson, Jr. et al. ..... 379/88 |
| 5,150,399 A | | 9/1992 | Yasuda ......................... 379/67 |
| 5,448,625 A | * | 9/1995 | Lederman ................. 379/88.25 |
| 5,539,809 A | * | 7/1996 | Mayer et al. .......... 379/210.02 |
| 5,646,982 A | | 7/1997 | Hogan et al. ................. 379/89 |
| 5,673,256 A | | 9/1997 | Maine ......................... 370/271 |
| 5,680,442 A | | 10/1997 | Bartholomew et al. ....... 379/67 |
| 5,835,126 A | | 11/1998 | Lewis ........................... 348/8 |
| 5,937,037 A | * | 8/1999 | Kamel et al. ............ 379/88.18 |
| 5,970,124 A | * | 10/1999 | Csaszar et al. ......... 379/88.18 |
| 6,298,056 B1 | * | 10/2001 | Pendse ........................ 370/352 |
| 6,324,528 B1 | * | 11/2001 | Hillson et al. .............. 705/400 |
| 6,385,308 B1 | * | 5/2002 | Cohen et al. ............ 379/88.23 |
| 6,484,148 B1 | * | 11/2002 | Boyd ............................ 705/14 |
| 2001/0012335 A1 | * | 8/2001 | Kaufman et al. .......... 379/67.1 |
| 2001/0048737 A1 | * | 12/2001 | Goldberg et al. ....... 379/114.13 |
| 2002/0077130 A1 | * | 6/2002 | Owensby ..................... 455/466 |

FOREIGN PATENT DOCUMENTS

| | | | |
|---|---|---|---|
| EP | 0 330 441 | 2/1989 | ............. H04Q/3/62 |
| EP | 0 511 831 | 4/1992 | ............. H04M/3/42 |
| EP | 0 531 048 | 8/1992 | ............. H04M/3/42 |
| EP | 0 682 457 A3 | 11/1995 | ............. H04Q/7/22 |
| EP | 0 820 181 A2 | 1/1998 | ............. H04M/3/50 |
| EP | 0 886 424 | 6/1998 | ............. H04M/3/50 |
| WO | WO 98/38782 | 2/1998 | ............. H04M/3/48 |
| WO | WO 99/18716 | 4/1999 | ........... H04N/1/413 |

OTHER PUBLICATIONS

Gerhard Bandow; "Zeichengabesysteme—2 Auflage", 1995, LTU Vertiebsgesellschaft MBH, Bremen XP002164315.

* cited by examiner

*Primary Examiner*—Scott L. Weaver
(74) *Attorney, Agent, or Firm*—Michael A. Glenn; Donald H. Henricke; Glenn Patent Group

(57) ABSTRACT

A voice messaging system. The voice messaging system includes a set of geographically distributed devices in which voice messages are stored and logic that causes voice messages to be stored in respective devices in the set of devices from which messages can be efficiently retrieved. The logic may cause voice messages to be stored in a device from the set of devices closest to a location from which the user has retrieved messages. A voice message system comprising logic that receives and stores messages from callers for respective users and logic that selects and plays a message not left by a caller to a user. The message is selected based on information about the user, and the message not left by a caller may comprise an advertisement. A method of storing messages in a voice messaging system that has a plurality of voice mail boxes associated with a plurality of subscribers. An incoming call is received and responded to based on a data field in an incoming call that identifies the subscriber's telephone number.

40 Claims, 17 Drawing Sheets

VOICE MESSAGING SYSTEM WITH SELECTED MESSAGES NOT LEFT BY A CALLER

REFERENCE TO RELATED APPLICATION

The present application claims priority from U.S. provisional patent application No. 60/136,906 filed Jun. 1, 1999, which is hereby incorporated herein by reference in its entirety. The present application is related to an application titled "Voice Messaging System" by Wendell Brown et al., Ser. No. 09/584,244 being filed concurrently herewith. The present application is also related to an application titled "Voice Messaging System Using Information From Incoming Telephone Call To Respond To A Call" Ser. No. 09/584,243 by Wendell Brown et al., being filed concurrently herewith.

BACKGROUND

1. Field of the Invention

The invention relates to voice messaging systems, in particular to voice messaging systems used in telecommunications.

2. Description of Related Art

The telecommunications industry has enjoyed many advances in the field of voice, data and other message storage and transmission. A simple answering machine such as one with a tape or digital storage mechanism allows for the storage of messages from callers calling a subscriber unavailable or too busy to answer an incoming telephone call. More advanced voice messaging systems may be coupled to a business phone system such as a private branch exchange (PBX), allowing for messages to various subscribers of the business phone system to be stored for those subscribers when they are unavailable or otherwise unable to answer incoming telephone calls. Such a voice messaging system may allow for storage, forwarding, broadcasting and other actions with respect to messages. Such a voice messaging system may be located in the same facilities as the business telephone system and thus provide local users access to voice messaging. Alternatively, voice messaging capability may be provided, for example, in conjunction with the local telephone system.

A voice messaging system typically includes a storage device and logic that causes messages to be stored on the storage device. Subscribers may desire to access the messages remotely and may do so by calling the voice messaging system and accessing the subscriber's respective account. Such a process may involve a long distance call from the location of the subscriber to the location of the voice messaging system. The subscriber is then typically greeted by a standard system message when calling into the system to access messages. The subscriber then responds by entering information associated with the subscriber's account.

Subscribers have found various uses of voice messaging systems such as broadcasting messages to various members of groups, taking personal as well as business messages and other uses. It would be desirable to achieve a more capable and efficient voice messaging system in order to meet the ever increasing needs of subscribers.

SUMMARY OF THE INVENTION

An embodiment of the invention is directed to a voice mail system comprising logic that receives and stores voice messages from callers for respective users and logic that selects and plays to a user a non-system message not left by a caller to a user. The message is selected based on information about the user. According to another embodiment of the invention, the message not left by a caller comprises an advertisement. The message not left by a caller may comprise information regarding current weather conditions. The information about the user may comprise demographic information. Alternatively, the information about the user may comprise sex, age and location of residence.

Another embodiment of the invention includes a voice messaging system. The voice messaging system includes a set of geographically distributed devices in which voice messages are stored. Logic causes voice messages to be stored in at least a device in the set of devices. The device is one from which messages can be efficiently retrieved by a user who is in a location from which the user is likely to retrieve messages. In one embodiment of the invention, the logic may cause voice messages to be stored in a device from the set of devices closest to a location from which the user has retrieved messages. In another embodiment of the invention, logic causes voice messages associated with a particular user to be stored in a device from the devices closest to locations from which user has retrieved messages within a particular time period.

DESCRIPTION

Figure 1A:
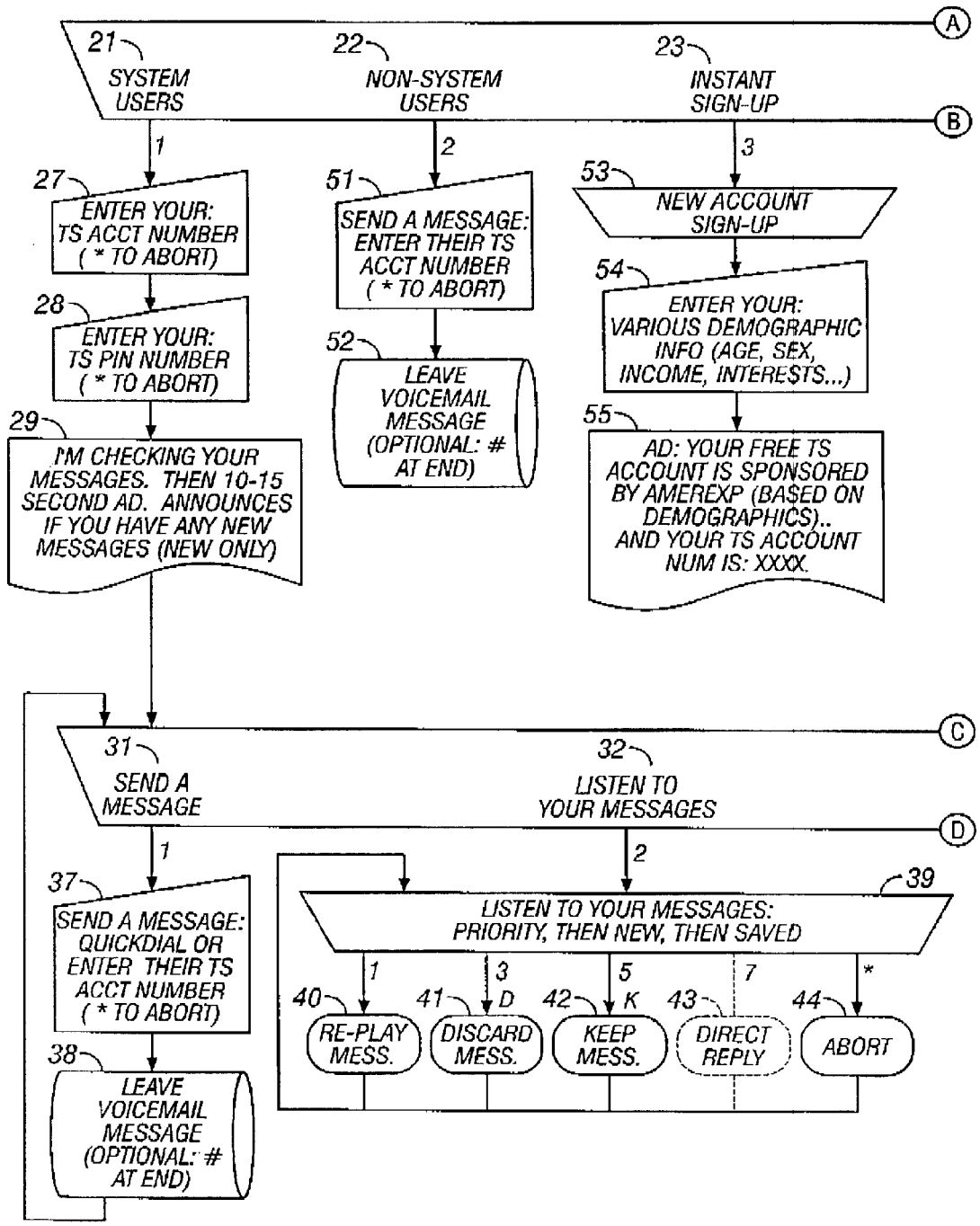
FIG. 1 is a flow diagram that shows a user's interaction with the system, according to an embodiment of the invention.

One example of the system is a voice messaging system in which individuals can leave messages from various locations in a public network and users of the system can retrieve messages from various locations in the public network. An advertisement or advertisements may be played to individuals accessing the system. For example, when a user accesses his or her messages, one advertisement may be played. In other examples of the system, by the user selecting numbers on the telephone key pad, the user may listen to a series of advertisements.

According to one architecture of the system, voice messages are stored in various locations throughout a geographic region. Messages are conveniently stored for access from various locations in the geographic region from which they may be accessed. For example, individuals leave messages via the public telephone network, which has a set of locations called central offices, which service various local geographic areas. A telephone call made within a service area of a central office is generally a local call, which is often toll-free. According to one example of the system, messages received throughout a broad geographic area are stored in the service area of a central office where the messages are likely to be retrieved. In this way, a user can make a local call to retrieve his or her messages. The messages can then be accessed from that local service area without long distance charges.

If the messages are not present at a local site, the local site may obtain the messages via a data network, e.g., the Internet, and then play the remotely obtained messages for the user. The messages that were obtained via the data network can then be stored at the local site so that they can be accessed locally. Additionally, the system can keep track of local areas from which messages are being retrieved or may try to predict which areas from which messages may be retrieved. Then, when messages are left for a user, the messages can be distributed to those local sites from which messages were accessed or from which the messages are likely to be retrieved.

The messages may be distributed via a store and forward mechanism, such as e-mail. When a user is retrieving messages that are not present in the local site, in order to save time, a mechanism such as file transfer protocol (FTP) may be used for faster access. Then, the messages can be distributed to various sites via a store and forward mechanism. When the user is accessing messages, while the messages are being retrieved from a remote location or from a local location, an advertisement, or other message may be played to the user.

According to another example of the invention, sites at which messages are received are located in various portions of a geographic area in which the messages may be left. Such sites may but do not necessarily have to be the same sites discussed above, from which messages are retrieved. For example, messages may be left in various portions of a geographic area, such as the United States, that are serviced by a public telephone network. According to an exemplary system, sites with equipment to receive messages are located in various portions of the geographic area. These sites receive the messages from the public telephone network and then forward the messages to other locations within the system via a data network, such as the Internet. Thus, for example, sites may be located in service areas of various central offices of the public telephone network. Then a local call can be made to the site via the central office, and such a call may be toll-free. Equipment of the system may be located at the central office or at an Internet service provider (ISP). Such equipment receives messages and forwards the messages to the appropriate location within the system. This appropriate location may be a location at which the messages are likely or most likely to be retrieved by the user for whom the messages are intended.

In one system, messages may be retrieved via a data network, such as the Internet. Voice messages may be retrieved, for example, via the world wide web. Such voice messages may be voice messages that were left via the public telephone network and stored and forwarded via the Internet or voice messages left directly on the data network or a combination of such messages. In one example implementation, when a user accesses the system via the Internet, the user's computer connection is routed to a site close to where the messages are likely to be stored. For example, the user may initially access messages via a browser and initially access a site in France. Messages may be stored in Germany, and after the user accesses the system, the system may transfer the browser to an Internet site in Germany. An advantage of such an approach is faster Internet access due to fewer hops.

According to one example of the invention, telephone calls to a user's telephone number are routed into the system. The caller may then leave a message on the system. Such calls may be routed based on no answer at the user's telephone number, or a delay, or a busy signal. The calls may be routed into the system based on a forwarding mechanism. In one example of the system, sites are located in local areas from which calls may be forwarded to the system without incurring long distance charges. For example, sites would be located in service areas of central offices that service the numbers called.

According to one example of the system, users interact with the system via the telephone interface. For example, users may interact with the system via a dual-tone controlled telephone interface (DTMF). In another example of the system, users interact with the system by way of a voice activated telephone interface.

According to one example of the system, an individual interacting with the system has flexibility in how his or her messages are distributed. For example, messages may be distributed to a group of recipients. A user of the system may pre-select groups to which messages may be distributed. Then, when a user creates a message, the user may select to send the message to individuals, pre-selected group or groups, or combinations thereof.

According to another example of the system, messages may be sent to an individual not subscribing to the system. Such messages may be sent via outbound calls. For example, a list of individuals to which messages are to be sent may include some individuals who are subscribers to the system and other individuals who are not subscribers to the system. The message may be forwarded to voice mail boxes of individuals subscribing to the system. For individuals not subscribing to the system, the system may make a telephone call to those individuals to notify them that they have a message. Upon receiving the telephone call, such individuals may be presented with a number options, including reviewing the message. Other options may include the ability to sign-up for the service or the ability to block future calls. An advertisement may also be played to such individuals. The outbound calls to such individuals not subscribing to the system may be controlled to take place at selected times of day or week or other selected time or time intervals. For example, the outbound calls may be selected to take place only at the time intervals at which such unsolicited calls may be made according to local, or regional, or international regulation.

One example of the system includes monitoring the caller ID of an incoming call. Alternatively, other data received with a telephone call may be monitored to determine information about the incoming call. Based on such information, various greetings or options may be presented to the caller. For example, if a telephone call is recognized as that of a user of the system, a greeting tailored to that user may be played. Also, language-based prompts may be automatically selected and played to the user based on the information about the incoming call.

According to one example of the system, a voice messaging system plays messages or a message, such as an advertisement, to individuals interacting with the system. Such messages may be tailored based on information about the individual accessing the system or based on information about the incoming call (e.g. caller ID). Information may be stored for users of the system, such as demographic information. The user's income, age, and sex may be stored in the system. Based on such information or other information, particular messages are played for the user. Additional information about the user may be stored based on the user's previous interaction with the system, for example, based on the user interaction with previous messages, such as an advertisement, data may be stored, and based on this data, future messages or advertisements may be selected and played.

Other information may be used to select and play messages, such as advertisements. For example, information about the weather or time of day may be used to select an advertisement. Information specific to the user's location may be used to select messages, such as the advertisements to be played. For example, local weather information or local news information or other local information may be used to select a message to be played to the user. The location of the user may be determined based on information previously stored about the user, or the user's typical locations, or may be obtained based on data regarding the location from which the user's call was originated. In one example, a user's location is determined based on the user's caller ID. Then, based on information obtained from another source, for example the Internet, the weather, temperature, information regarding events, or other information regarding the user's location is determined. Then an advertisement specific to that information is played to the user. For example if the weather is cold, an advertisement for hot chocolate is played. If the weather is warm, an advertisement for a cold drink is played. In one system, the user may interact with the system to cause messages, such as advertisements, to be played. The user may be able to select one, more than one, or an entire series of such messages. In one example, such selection may be modeled on a tree structure in which a large number of possible messages may be selected from, based on the sequence of selection by the user.

In one example of the system, a user may cause a telephone call to be placed to another subscriber associated with a particular message. For example, when encountered with an advertisement, the user may be presented with a option to cause a telephone call to be made to advertiser. For example, the user may be listening to an advertisement for clothing. Then the user is presented with option to be connected to the clothing merchant. If the user selects the option, a telephone call is placed connecting the user to, for example, the catalog call center for the clothing merchant.

According to one system, a user may select to have reminders left for the user in the future. Such reminders may be made in the form of voice messages. Alternatively, such reminders may be other types of messages other than the typical voice mail message left for the user. Such reminders may be associated with a particular service or product. For example, the user may select to have a reminder left based on an anniversary or birthday. Within a particular time of the reminder date or time, a message is provided to the user the next time the user interacts with the system. For example, when the user interacts with the system at the appropriate time, the reminder of an anniversary may be provided followed by an option to be connected with a flower delivery service.

The location of sites in various local areas where they can be accessed via a local telephone call and where messages can be left via a local telephone call has an advantage of allowing for a free of charge or low cost voice-messaging system. By transmitting messages between the various sites via a data network such as the Internet, world-wide coverage maybe provided at a relatively low cost.

According to one embodiment to the invention, all or part of the following information is obtained from users who sign up for free accounts over a telephone: user's sex, year of birth, area code, zip code, and occupation. The user's area code may be detected by a caller ID so that the user may not have to actually enter such information. The user's zip code and occupation may be optional items for entry. The user's occupation may be entered as one of five categories of occupation. In a web-based account signup similar information may be obtained.

A user of the system chooses an account number (or none). A user may be prompted to use preferably his or her existing home telephone number as the account number. According to one embodiment of the invention, a mechanism is provided to help prevent users from using the telephone numbers of others as their own account numbers. One possible mechanism to implement such a requirement is to require that such a user sign up from a telephone having the telephone number that the user wants to use as the account number. Then, using the caller ID, such telephone number is verified as the correct telephone number. Alternatively, a callback is made to the user at the user's telephone number requiring entry of a PIN to verify that the user is calling from the specified telephone number. A user may be allowed to sign up and select a number from any location but then may be required to telephone from the selected number in order to turn on the account.

Messages may be designated to be sent to various users within the system via a variety of approaches. For example, the individual leaving the message may have an option to send a message as a direct reply to a voice-mail message. The message may be sent to a user based on selection of an account number in the system to which the message should be sent. The message may be sent to a recipient from a quick-dial list. A message may be sent based on a directory within the system, which may be accessed by using a telephone keypad to type letters of the name of the recipient, or by other lookup means such as voice activation. A message may be sent to a broadcast list, which is maintained by a user or a group of users. A message may be selected to be delivered at a particular time or date (e.g. on a birthday).

Messages may be retrieved by various methods. A message may be retrieved by a telephone, via a local telephone call. In areas not serviced by the system with a local site, messages may be retrieved by other telephone numbers, such as an 800 number. Messages may be retrieved via playback over a data network, such as the Internet. Voice-mail messages may be retrieved via the world wide web, for example by a mechanism such as a Real AUDIO or by download of WAV files. Messages may be retrieved via e-mail which is mailed to a preselected account designated by the user. Such voice messages may be e-mailed with a WAV file attachment.

Several approaches may be used to notify a user that messages have been received on the user's account. A page may be sent to the user's pager. According to one embodiment of the system, the message is sent to the pager itself. An e-mail may be sent. A phone number may be rung. An ICQ "ring" notification may be used.

Outbound delivery of voice-mail messages may be provided. A user indicates to the system that the user wishes to receive messages at a particular telephone number. This telephone number may be updated subsequently. When a message is received for the user, the system initiates an outbound call to the number designated by the user. According to one embodiment of the invention, the system uses the site nearest the specific phone number to which the call is to be made. This approach has an advantage of minimizing toll costs. The system includes routing tables (with area codes and prefix numbers) to help it route the outbound call request to the appropriate site. The system then determines whether the outbound call was answered either by a human being or an answering machine. If the call is answered by a human being, then the system (optionally) requests that a human enter a security PIN, to help ensure that the user's messages are not delivered to the wrong person. If the answering machine answers, then the system either, depending on implementation, 1) plays the voice message into the answering machine or 2) leaves a message on the answering machine that the system attempted to deliver a message. If the user answers the call, then user may be offered the option of an immediate reply to the voice-mail message. When a caller calls the system to leave a message for the user, according to one embodiment of the invention, the caller does not know the telephone number to which the messages are to be sent. Also, according to one embodiment of the system of the invention, the caller does not know whether the user has selected such an outbound delivery option.

The system may store a speed-dial list for users. Such a list may be frequency sorted, depending on the frequency with which the user uses the speed-dial number. According to one embodiment of the invention, the speed-dial list is limited to five to eight system account numbers. The system automatically sorts this list by most frequently used system account number.

According to one embodiment of the invention, the system stores a personal contact book-style directory to provide a list of individuals to whom the user sends messages or calls. According to one embodiment of the invention, such a list contains a list of phone numbers. According to another embodiment of the invention such a list contains a list of system account numbers. According to another embodiment of the invention, such a list may contain a combination of such account numbers or phone numbers. The system may allow a selection of names from the personalized contact book via entry of digits on the touchtone keypad. Such entry of digits may correspond to the account number of such person to whom a message is to be sent or may correspond to the name of the person to whom the message is to be sent.

According to one embodiment of the invention, a directory is maintained of all users of the system. Depending on whether such user selected that their information remain private, this directory may be available to various or all users of the system. Information may be searched based on last name, city, state, or other criteria, depending on the implementation. Such a directory may be linked to directories of other systems, for example, a directory provided by a telephone company, or a directory provided by an Internet-based directory system.

When an individual calls to leave a message for a user, the individual is greeted with a voice greeting. Various types of voice greetings may be provided by the system. According to one embodiment of the invention, particular users may prerecord a complete message, such as an entire sentence or several sentences that directs a caller to leave a message or provides other information. Other users may be required to use more abbreviated forms of messages, or less personalized forms of messages. According to one embodiment of the invention, a user selects from among a set of possible greetings. Such greetings may be provided in the alternatives of male or female voice. A user may select a greeting that is at least partially prerecorded. Information is recorded from the user and inserted within such a greeting. For example, "Hi, this is Jason, leave your message at the beep." The user's name (Jason) would be inserted into the greeting from a recording from the user. Alternatively, the system has a number of common names that are prerecorded from which the user may select. According to another embodiment, the user types into a computer system the text of the greeting. The phone server, using computerized voice synthesis, synthesizes the greeting. Also, the greeting may be selected based on the time of day. For example, from 9 a.m. to 5 p.m. each day (local time) a particular greeting may be played. Otherwise another greeting may be played.

Other capabilities are possible for the system. According to one aspect, a notification is provided to a user that a voice-mail has been delivered. Such feature may be provided only to particular users of the system, or to all users of the system. A "send a voice-mail" plug-in may be added to software, such as Microsoft Net Meeting. According to another embodiment of the system, the system is integrated with internet protocol (IP) telephony, or other data network-based telephony. First a real-time voice conversation is attempted, then, if no one answers, the system allows the caller to leave a voice-mail message. In such a system, the user is typically within the system while attempting to call and while leaving the message. According to another embodiment of the system, the user may archive voice-mails for eventual long term, or permanent storage. After the user has listened to the voice mail, another option after the usual "Press X to save this message, press X to delete message, press X to reply directly to this user now", is to press X to archive this message.

According to one embodiment of the invention, a user may request that the system provide information about particular products or services. Such information may be requested via the telephone interface. For example, the user may type particular digits which correspond to the names of or abbreviations of or acronyms standing for the product or service about which the user wants to obtain information. Such information may be provided from a particular merchant, or the user may be able to select among a number of merchants information related to the category of product or service. For example, the following may be entered by a user via a telephone keypad or interface to select information about the respective product or services:

411—user directory

TALK—system product and service information

REMI—anniversary, birthdate or other reminders, such as may be handled by a greeting card company or flower company, or other gift company TIME—local and/or other time, as may be handled by a watch company or other company STOC, or STOCK—stock quotes FLOW—flowers HOTE—hotels AIRL—airlines CARS—car rental REVE—reverse telephone lookup AREA—location of the area code CAID—provide caller ID CALL—long distance services (e.g., by the Internet)

According to one embodiment to the invention, special accounts are provided to which users can leave messages and then receive an automated response voice-mail back from the person for whom the message is left. One use of such a feature may be to allow users to leave messages for celebrities. The system then issues an automated response back from the celebrity.

In an embodiment of the system which plays advertisements to users, logic is provided that selects the advertisement that is to be played. The advertisement is targeted to the specific user. The advertisement is selected for the user based on matching information about the user with an advertisement from an active set of advertisements, or portfolio of advertisements. Each advertisement has an associated set of information, a profile, which describes attributes of the intended audience for the particular advertisement. An advertisement profile has information such as, or a combination of:

Advertisement client name and account number ("American Express", "12345")

Advertisement to client promotion name ("Spring '98 College Student free promotion")

Advertisement to category (in U.S.—English language, 10 second long, primary (root) add, or "extended advertisement" (if user requests additional detail))

Advertisement to valid details (e.g., Mar. 1, 1998 to Mar. 31, 1998, or only between 10 a.m.–2 p.m.)

Advertisement auto-expiration date (auto delete this file on, for example, e.g., Dec. 31, 1998 from all systems)

Advertisement valid geography play details (city, area code, country, etc., website play yes/no)

Advertisement to valid user demographic details (e.g., age range 18–25, male or female, income range, employment categories . . . )

Advertisement to point score rating criteria (e.g., add 1 point if age is <22, add 1 point if income is >$ 100 k; etc.)

Advertisement technical details (.WAV format, 8,000 sample/second 8 2bit . . . )

A two-step approach may be used to match an advertisement to the user. First, filtering is performed. In filtering, all advertisements which meet the criteria are selected (e.g., user is within age range, can be played within this area code, etc.). Next, from among the advertisements that pass the filter, the advertisement with the highest point score is selected. Among the advertisements with equally high point scores, an advertisement may be chosen at random. According to an embodiment of the system, the following inputs are taken into account in the decision as to which advertisement to select: the user's account number (and the associated user information), the advertisement player venue (e.g., which phone server will play the advertisement), date/time (local time), which phone server sends the message). Various combinations of such information may be used to select the advertisement that will be played to the user. The information about the user may include: user's age, sex, zip code, and preferred language. Additional information about the user may be included, for example, user's occupation, marital status, and income bracket.

Information may be stored regarding which advertisements were played at what times. For example, a phone server and web server may keep daily log files of all advertisements that were played during the calendar day by the individual phone server or web server. Such a log file may contain a header with information regarding the creator of the file (the phone server) and the calendar day for which the log file records information. This log file may have in formation such as: the local time that the advertisement was played, the user account number for which the advertisement was played, the advertisement which was played, and information as to the user response to the advertisement. Various combinations of such information may be stored in the log file. In one example of the system, at the end of each day, each phone server or web server then e-mails the log file to a central depository in the system. The phone server or web server may maintain copies of the various log files for the purposes of backup, for example for approximately 30 days. Then such files may be deleted. According to another embodiment of the system, such log files are then processed by the system or by an outside system for auditing purposes or for market research purposes.

Because information regarding which advertisements were played for a particular user may be stored, a series of advertisements may be played for a user over a number of sessions or future advertisement s may be selected for the user based on past advertisements the user has heard.

Data is collected by the system in order to bill the product or service providers that are advertising on the system. Based on such information, air time management reports are provided, and advertisement client management reports are provided. According to one embodiment of the system, play information is e-mailed automatically directly to the client merchant or service provider. Merchant or service provider clients may be sent bills in which they are billed based on the amount of time that the advertisements are played to prospective customers. This data may also be used to troubleshoot the system. If an e-mail is not received from a phone server at a time when it is expected to be received, then an alarm is sent to a system administrator.

The statistics may be created about the users of the system. Such statistics may be based on the collection of users of the system and may include data on the age distribution, age range distribution, geographic distribution, income distribution, or other data of the system. Reports may be automatically generated which provide such information.

FIG. 1 is a flow diagram that shows a user's interaction with the system according to an embodiment of the invention. The flow chart shows how a user may navigate the system via a selection on a touchtone keypad for example. Users may access their messages and send messages and perform other tasks. Nonusers may send messages to users, sign up for an account, or perform other actions. For example, individuals accessing the system may participate in sweepstakes. According to one embodiment of the invention, the system may be configured to allow certain users to access messages without hearing advertisements, as may be offered for users who pay an additional fee. Sweepstakes may be offered in which one out of every certain number of voice-mail callers get a prize. For example, one out of every 1,000 individuals leaving a voice-mail may get a prize, or one out of every 1,000 individuals accessing their voice-mail messages may get a prize. Information other than advertisements, such as horoscopes, sports scores, etc., may be played to users of the system.

According to one embodiment of the invention, messages are played back 20% faster than recorded with pitch adjustment in order to help reduce phone line congestion.

Users may be signed up in a variety of manners. For example, users may be signed up via an 800 number. Users may be signed up by calling a local 555 number.

FIG. 1 includes top level block 20 and the system user main menu 30 as well as respective branches coupled to such blocks. Top level block 20 includes system users branch 21, non-system user branch 22, instant sign up branch 23, sweepstakes branch 24, merchants and information branch 25 and help branch 26. System users branch 21 is coupled to enter account number 27, which is coupled to enter pin number 28 and message check (with 10–15 second advertisement and announcement if there are any new messages) 29. Non-system users branch 22 includes send a message (enter account number) 51 and leave voice mail message 52. Instant sign up branch 23 includes new account sign up 53, enter demographic information (such as age, sex, income, interests, etc.) 54, and advertisement (which may also include account number and which may be based on demographics) 55. Sweepstakes branch 24 includes advertisement with sweepstakes 56. Merchants and information branch 25 includes touchtone expressway to merchant and promotional sponsored user services 57. Block 57 may include, for example, the choices of a user directory, product and service information, anniversary/birthday reminders, clock and world-time, stock quotes, flowers, selected hotel partners, selected airline partners, selected rental car partners, select reverse telephone number lookup (for example by internet), area code information, caller ID information, long distance services (possibly by internet), giveaways for particular products, prizes, etc. Help branch 26 includes help and alternate language selection 58 and advertisement 59.

System user main menu 30 includes send a message branch 31, listen to your messages branch 32, sweepstakes branch 33, user settings/merchants and information branch 34, help branch 35 and abort branch 36. Send a message branch 31 includes send a message (allowing quick dial or enter account number) 37 and leave voice mail message (with optional number at end) 38. Listen to your message branch 32 includes listen to your messages (including priority, then new, then saved) 39, which includes options: replay messages 40, discard messages 41, keep messages 42, direct replay 43 and abort 44. Other choices which may be available to a user would include for example playing messages slower, playing messages faster, going back 5 seconds, skipping forward 5 seconds, telling details about the sender, putting the sender on the priority list, playing other messages from the sender and help. Sweepstakes branch 33 includes advertisement for sweepstakes 45. User setting/merchants and information 34 includes advertisement (such as one that allows the choice of entering a merchant information or changing user settings) 46, merchants and information 47 and change user setting 48. Help branch 35 includes help 49. Abort branch 36 includes abort 50.

Figure 2:
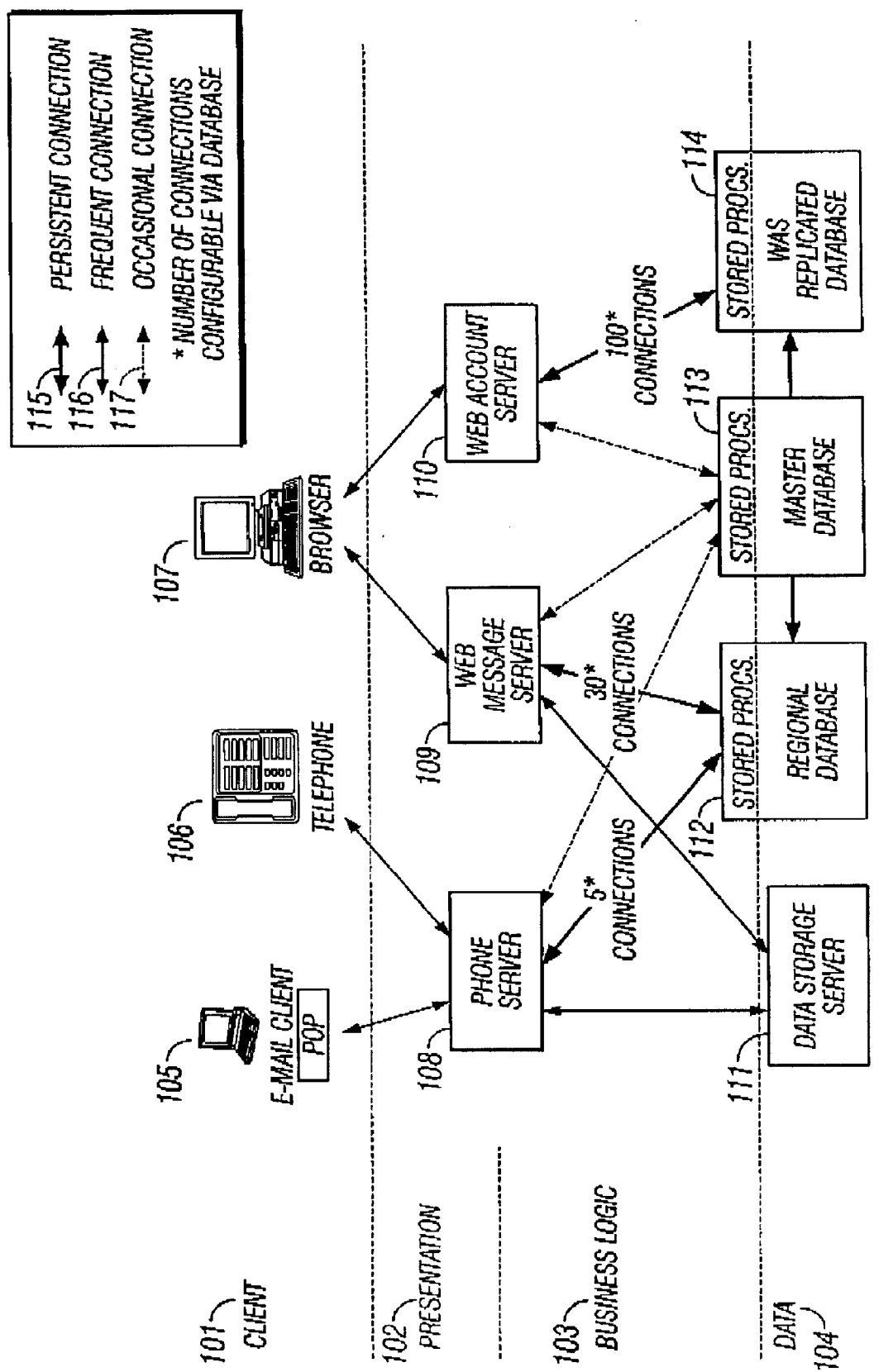
FIG. 2 shows an architecture of the system, according to an embodiment of the invention.

FIG. 2 shows an architecture of the system, according to an embodiment of the invention. It should be understood that the invention may be implemented using various architectures and that the invention is not necessarily limited to the architecture shown in FIG. 2, in the other figures and description herein. FIG. 2 includes client level 101, presentation level 102, business logic level 103 and data level 104. Connections are shown as persistent connection 115, frequent connection 116, and occasional connection 117. FIG. 2 includes e-mail client POP 105, telephone 106, browser 107, phone server 108, web message server 109, web account server 110, data storage server 111, regional database 112, master database 113 and WAS replicated database 114. The phone server 108 interfaces with two telephone lines and delivers advertisements in audio format. The web message server 109 provides interface to the World Wide Web and delivers advertisements in video and audio format. A web account server 110 provides an interface to the web and allows a user to manage the user's account. The data storage server 111 stores user messages. Typically data storage servers are located in various local areas so that the user may access the data storage server locally without incurring long distance telephone charges. Phone servers are also typically located in local areas in which individuals calling the system can call without incurring long distance telephone charges. Messages are routed to the appropriate data storage servers based on a prediction of where the user will likely access his or her messages. Such a prediction may be based on where the user has previously accessed his or her messages and based on other information provided by the user such as the user's address. The master database 113 and regional database 112 are used for account creation and editing of the profile of users, such as preferences. Such account creation and profile information is edited at the master database and is replicated to the regional database 112.

The phone server 108 may perform the following functions: recording a voice message from an individual which is stored for eventual playback by the recipient, playing messages for the recipient, playing messages for the recipient, creating a new account for a person, and modifying preferences for a user. Phone servers are typically located in local areas serviced by the system. A web account server 110 creates a new account for a user and modifies preferences for the user. Web account servers are typically located centrally in the same facility as the main database.

A data storage server 111 is used to store voice messages. One or more data storage servers are located at most local sites. Locating a data storage server at local sites has an advantage that many voice messages may never need to be transmitted over the Internet. A user's voice messages are routed so that there is a copy at each data storage server (DSS) at each site from which the user is likely to retrieve messages. This helps to minimize retrieval delay.

A web message server displays a list of messages in the user's mail box and plays messages for the user. One or more web message servers are located typically at a local site where a data storage server is located. The web message server provides a web interface to the user's voice messages stored on the associated data storage server.

The main database and its associated database (in cluster configuration) store information regarding user profiles, messages, system components, and relationship among system components. The main database contains procedures that perform queries, translation, and access to the data on behalf of a phone server, web account server, or web message server. The main database cluster is typically centrally located.

The regional database stores a replicated copy of the main database's information and additional information on a web message server session and web account server session. The regional database contains procedures that perform queries, translation, and access on behalf of a phone server, web account server or web message server. The regional database are typically distributed world wide. At least one regional database is typically on the same LAN as the main database. Typically all web account servers use the regional database.

Typically servers are looked up using DNSs because antispamming DSS and SMTP servers perform a reverse DNS to authenticate the connecting client. SMTP servers are used to transmit mail between sites. Both system SMTP servers and external SMTP servers are utilized.

FIG. 3 shows a more detailed block diagram of the system, according to an embodiment of the invention. FIG. 3 includes single location 150, internet 168, San Francisco phone site 190, west coast regional database site 188 and Los Angeles phone site 189. Single location 150 includes carrier group 191, network control/user billing group 192 and advertisement distribution and billing group 193. Group 191 includes web account server 151, web account server 152, web redirection server 153, master database (for which the engine may be implemented by a computer with appropriate database software) 154, web account server 155 and primary DNS 156. Network control/user billing 192 includes network management station (browser) 158, user billing 159, network control STAT/POLL POP3 (ALRT) 160, software and greeting update server ftp server to PS 161 and switch 162. Advertisement distribution and billing 193 includes advertisement placement/customer billing 163, customer database 164, advertisement place stats POP3 165 and advertisement distribution server ftp server to PS/WMS 166 and switch 167. San Francisco phone site 190 includes phone server 172 with T1 24 voice channels 170 and T1 24 voice channels 171, phone server 173 with T1 24 voice channels 174, switch 169, SMTP server 175, DSS DSL 136 and web message server 177. West coast regional database site 188 includes switch 180, secondary DNS 178 and replicated database (which includes appropriate processor and database) 179. Los Angeles phone site 189 includes phone server 183 with T1 24 voice channels 182 and phone server 184 with T1 24 voice channels 195, switch 181, DSS APA 185, DSS APA 186 and WMS 187.

On the right-hand side of the diagram, a single site 190 is shown. The site 190 receives input from a number of voice channels, shown here as T1 voice channels 170, 171 and 174. Such voice channel input is received by phone servers that are connected by a LAN (100 Mbit). The local site is connected to the Internet for communicating with other sites and with central billing and advertisement distribution sites.

The advertisement distribution and billing modules 193 allow for advertisements to be distributed to various local sites and to be played to users. Information is provided regarding an advertisement view profile and price profile from the customer database 164 to the advertisement placement/customer billing module 163 and as a result a bill is printed, which can be sent to the advertising client.

The following may take place in order to place an advertisement where it can be played by a user. Customer, advertisement, billing, and other information is first entered into the advertisement placement/customer billing module. Information from the master database from the central location is provided regarding target users. This information is provided to the advertisement placement/customer billing module 163. Based on the target user information and the other information received by the advertisement placement/customer billing module 163, the customer database 164 is updated. An advertisement is submitted for distribution from the advertisement placement/customer billing module 164 to the advertisement distribution server 166. The advertisement and play profile is then distributed from the advertisement distribution server 166 to the various phone servers within the advertisement play area. The advertisement and play profile are distributed from the advertisement distribution server to the web message servers within the advertisement play area.

Various advertisement play statistics may be collected. Incremental advertisement play statistics may be obtained from the web account server from the central site, the phone servers from local sites (e.g., Los Angeles phone site 189, San Francisco phone site 190), and the web message servers from local sites (e.g., 187, 177). Such information may be obtained by advertisement play stats POP3. Then the customer database may be updated accordingly.

Various adjustments may be made to the system as changes occur. For example, as a new DSS is added, information in the central database is updated regarding the neighbors of the new DSS. A site or a cell may be divided. When such action occurs, information regarding neighbors is updated in the central site and is propagated appropriately to local sites.

The system receives messages as follows, according to one embodiment of the invention. First a phone server typically located near the caller answers the telephone call. A message is recorded for a user or a set of users. E-mails are sent from the phone server via the SMTP server to the appropriate DSS or sub-DSSs on the user's distribution list. The user's distribution list is obtained from the replicated database at, e.g., west coast regional database site 188.

Messages may be retrieved from the system. First the user calls the system typically by dialing the number of a local phone server. The user's profile is obtained from the replicated database, for example at the west coast regional database site 188. Message headers may be provided from the local DSS account provided that such information is stored in the local DSS. A menu is provided to the user by which the user may select various actions. The user may then select a message to be played. The message file is provided from the DSS to the phone server for playing of the messages. An advertisement is then played before the message. Next, the message is played. An updated index is sent to all DSSs on the distribution list which indicates which messages were played.

Messages may also be retrieved when the messages are not stored on the local DSS. The system answers the call. Next the user profile is obtained from the closest regional database. For example, the user may be calling into the San Francisco phone site 190 and the information for the user profile may be obtained from the west coast regional database site 188. Message headers are obtained from the closest DSS that has the messages. For example the Los Angeles phone site 189 may be the closest DSS, and the messages are obtained from this site. The user's index is also provided from the closest DSS. A menu is played for the user allowing the user to select various options, such as playing the messages. The message file is transmitted from the far DSS (Los Angeles) by the phone server that is local (San Francisco). An advertisement is played before playing the message. Next the messages are played. A user account is created at the local DSS, based on a prediction that the user will access messages from the local site in the future. The local DSS is synchronized with information on the far DDSs. The index is updated on the local DSS as well. An index is updated at the far DSS (Los Angeles) in order to place the local DSS (San Francisco) on the distribution list. The files are stored on the local DSS. In the master database the local DSS (San Francisco) is added to the user's distribution list.

The user may retrieve messages via the web. For example at the web account server, first a user profile is obtained. Next, message headers obtained from the site storing the messages (e.g., Los Angeles). The user's index is also provided from that DSS. A menu is played which allows the user to select various options. The user may then select a message. An advertisement is played before playing the message.

When a user logs on to a phone server, the phone server requests that the database select an optimal data storage server that contains the user's messages. If the data storage server is far, after handling the current session, the phone server will create a new user account on one of the closest data storage server machines. Typically the closest machines are on the same LAN as the phone server. If the user's messages are already stored on one of the closest machines, there is no need to create a new user DSS account. Some data is located in a middle distance (close). Such DSS servers are nearby, for example, on sites on the same Sonet ring. In one example implementation, such user information is accessed from such DSS servers directly and a new DSS account is not created on the closest server. An advantage of such an approach is that data transmission may be saved if the user's DSS account is on the same LAN as the phone server if messages are left and retrieved from phone servers on the same LAN. In such a case, no data goes over the Internet.

Regional close relationships may be defined. Regional relationships are used in order to determine the best from among far DSSs for a given phone server end user. Such DSSs are then selected based on whether they are members of a local region, as opposed to simply being based on the distance. An advantage of such an approach is that regions can be created by human intervention to take into account political boundaries or technical issues, which may have an influence on tariffs or speed of access. For example, it may be better to access a server that is 10 miles away and stay within the border in Germany rather than accessing a server 5 miles away in France.

According to one embodiment of the invention, a user's voice mail messages may be sent to another system. Such a system may be separately administered, as by another service provider, for example. In one embodiment of the invention, for example, a first system having various storage devices for voice mail messages sends an e-mail including a voice mail message or messages to a second, separately administered system. In one embodiment of the invention, the second system informs the first system that a message has been received or listened to. The second system may inform the first system that the message has been deleted, after the user takes an action on the second system to delete the message. The second system may inform the first system of such actions of reading a message, deleting a message, or other actions by way of an e-mail from the second system to the first system. According to one embodiment of the invention, the second system informs the first system of changes after a period of time, for example, after 5 minutes of the user not making any changes. The e-mail from the second system to the first system may include control information and/or an authentication string for security. An application programming interface (API), according to one embodiment of the invention, is defined for communication between a first system and another system or systems, such as the first and second systems in the examples above. According to one embodiment of the invention, when the message, such as an e-mail message, containing the voice mail is opened at the second system, the second system determines whether the message originated from the first system, such as by validating an authentication string in the message. Thus, according to one embodiment of the invention, the second system informs the first system that the message has been read or deleted only for messages that have been authenticated.

The second system, to which voice mail messages are sent, may be an e-mail system, according to one embodiment of the invention, or a voice mail system, according to another embodiment of the invention, or other electronic messaging system. For example, the second system may be an e-mail system administered as part of an Internet portal. Thus, according to one embodiment of the invention, a user's account is synchronized between different systems, such that various actions performed on messages on one system are later reflected on another system.

FIG. 4 shows a phone server software structure according to an embodiment of the invention. The phone server software structure includes a user interface 201, services 237, network I/O 238 and external servers 239. FIG. 4 also includes STAR file(s) (one for each unique user interface presented to user) 200, STAR state machine (one thread, non-blocking) 202, channel state data set 203, channel state data set 204, channel state data set 205 and channel state data set 206, CT board I/O 207, channel data set 217, channel data sets e.g. 218, 219 and 220, phone server listener (PSL) separate process reconfigure reboot 221, create user account (creates worker thread) 224, user log in session set-up (worker thread) 225, check for messages (worker thread) 226, play a message (worker thread) 227, edit to user account (worker thread) 228, send a message (from user's view) (worker thread) 229, check for full mail box (worker thread) 230, forward a message (worker thread) 231, tone street functions 232, send outbound voice mail (e.g., if greater than 70% lines utilized) 233, initialization 234, send a message (from system's view) 235, report operational statistics 236, mail queue thread 223, power up 260, window message queue for queued tasks such as system-send mail, controlling non-time critical fumctions 216, functions sends initiating message 214 and functions sends initiating message 215. FIG. 4 also includes synchronous API boundary 210, non-blocking call 208, completion message 209, completion message 211, completion message 213, non-blocking call 212 and via registered message 270.

Additionally, FIG. 4 includes DSS-DSL interface 240, database interface with database connection manager 241, local disk storage interface 242, mail interface 243, SNMP agent 244 and error notification 245, which are in the network I/O section 238, which includes service routines with reentrant, thread safe code. In services 237 a worker thread is spun up as needed for a sequence of blocking operations, the caller is returned to immediately, the thread stuffs the results into the channel dataset, and a message is posted to the state machine upon completion. FIG. 4 also includes, external services 239, data storage server (DSS) DSL service 246, regional database (RDB) 247, fail-over regional database (RDB) 248, main database (MDB) 249, SMTP intra-site 250, SMTP intra-site 251 and network control server (NCS) 252.

Figure 5:
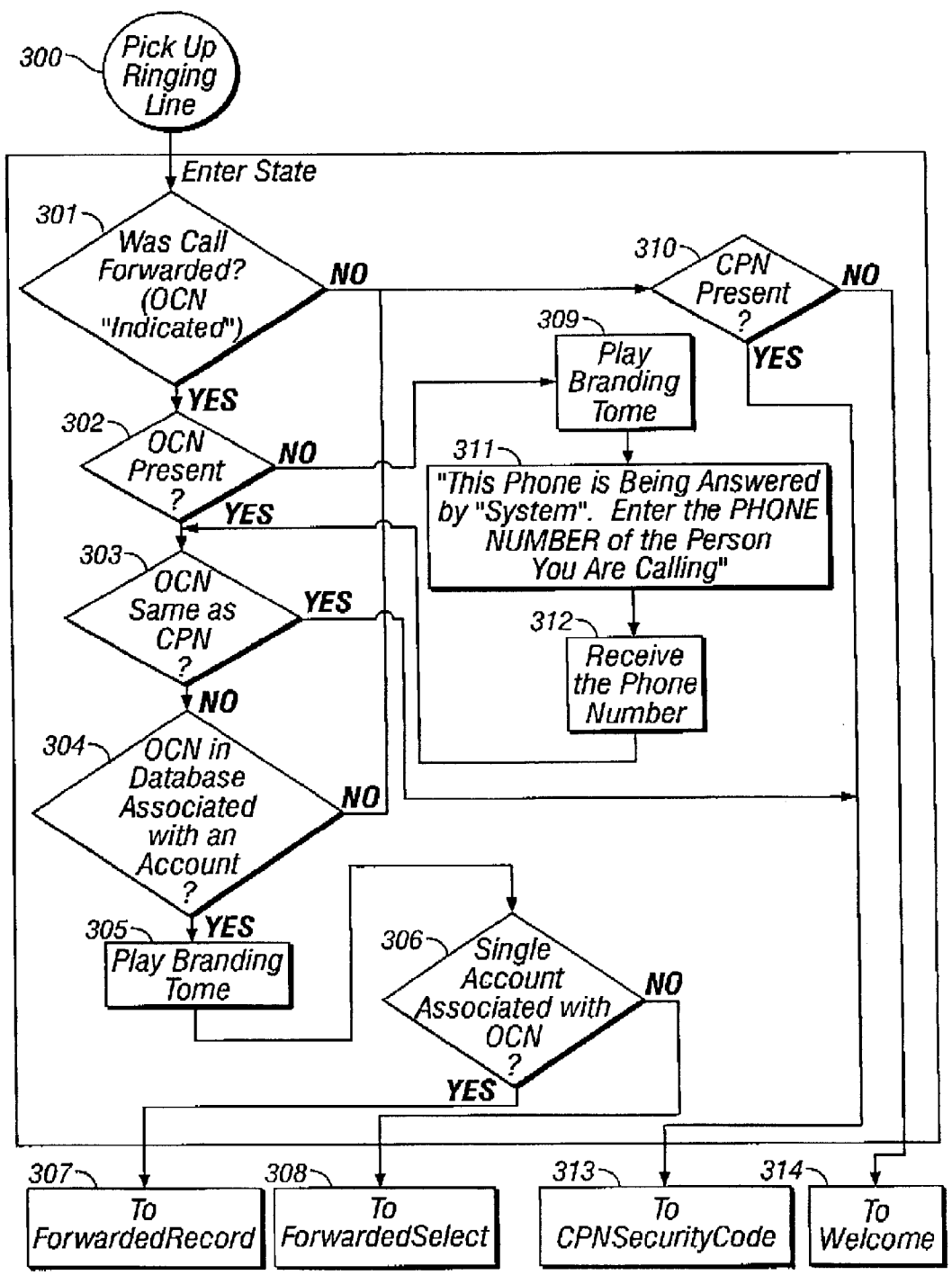
FIG. 5 shows a phone server main state diagram, according to an embodiment of the invention.

FIG. 5 shows a phone server main state diagram, according to an embodiment of the invention. The diagram shows that a ringing line is picked up and determination is made whether the call was forwarded and other steps are taken to determine how to handle the incoming call. FIG. 5 includes pick up ringing line 300, was forwarded (OCN (original called party) "indicated") 301, OCN present 302, OCN same as CPN 303, OCN in database associated with an account 304, play branding tone 305, single account with associated OCN 306, to forwarded 307, to forwarded select 308, play branding tone 309, block which prompts the caller indicating that the phone is being answered by the system and asks for a phone number of the person being called (which may not necessarily be the account number) 311, receive the phone number 312, CPN (calling party number, such as caller ID) present 310, CPN security code 313 and welcome 314.

Based on the telephone number that was originally called (original called number, OCN), the system may respond in various ways, such as by storing a message in the proper mail box or by providing a prompt associated with the subscriber who was called. A subscriber may have multiple mail boxes which are selected based on the caller ID of the incoming call. In one embodiment of the invention, multiple subscribers share a single mail box. In another example of the invention, when an incoming call arrives on the system and the incoming call does not have an OCN, the caller is prompted to identify the party that the caller was attempting to call. These methods and systems related to OCN may be implemented in various types of systems, for example, a voice messaging system contained in a single location coupled by a local interface bus or a system including a local area network (LAN) or other systems according to various other embodiments described herein.

Figure 6:
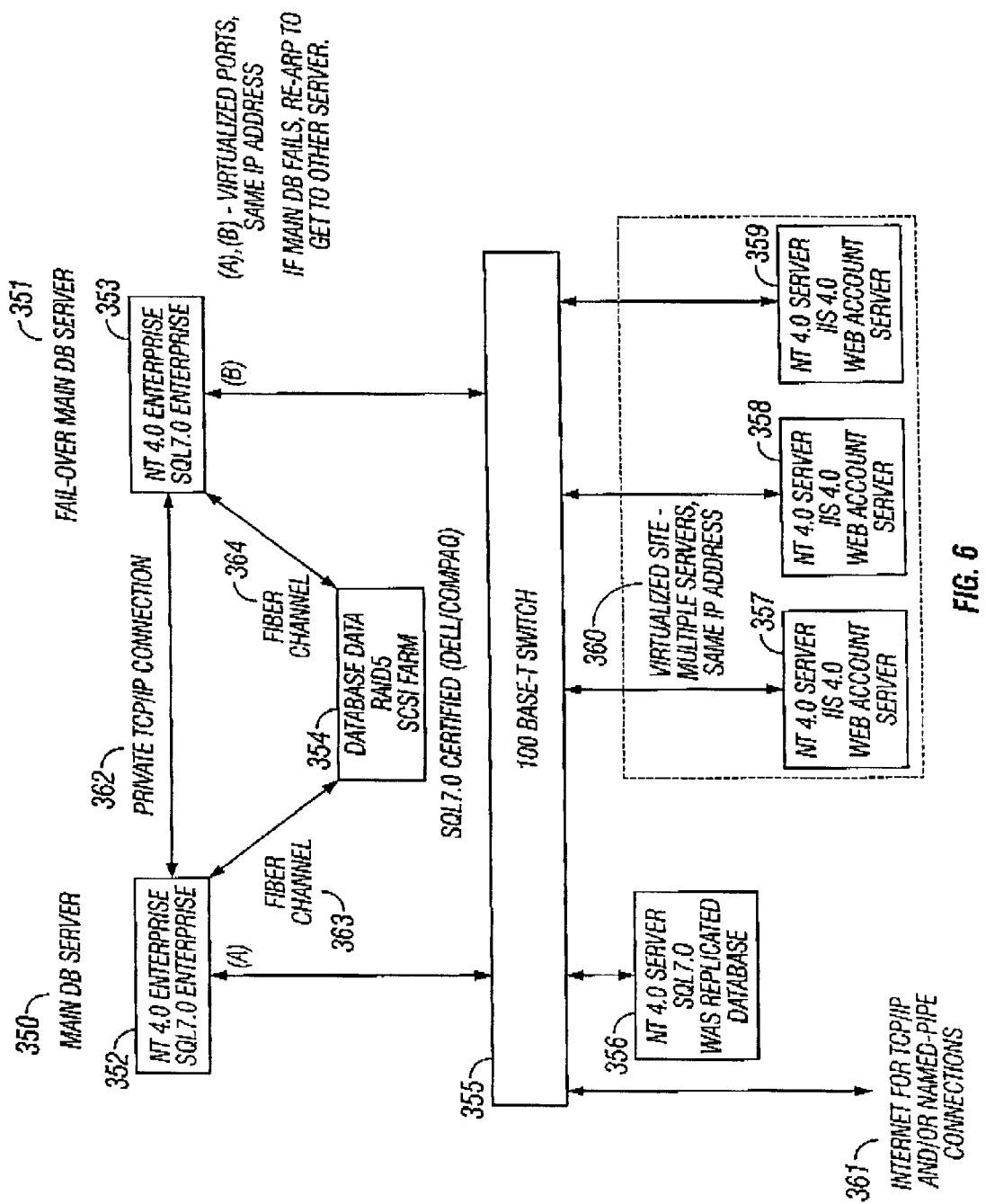
FIG. 6 shows a block diagram of a main database cluster, according to an embodiment of the invention.

FIG. 6 shows a block diagram of a main database cluster, according to an embodiment of the invention. The main database typically does not store message information. An advantage of such an approach is that space is saved on the main database. The main database is centralized world wide and implemented in a cluster configuration. The information in the main database is replicated in regional database. For example, six regional databases may be deployed in the United States. When a new account is created, it is created at the master database. The main database server and the rollover main database server communicate via TCP/IP connection. If one database fails, the database which has not failed takes over and handles the functions of the database.

FIG. 6 includes main database server 350, fail-over main database server 351, NT4.0 Enterprise SQL 7.0 Enterprise 352 NT4.0 Enterprise SQL 7.0 Enterprise 353, Database data RAID5 SCSI farm (SQL 7.0 certified) 354, fiber channel 364, private TCP/IP connection 362, 100 base-T switch 355, NT4.0 server SQL 7.0 WAS replicated database 356, internet for TCP/IP and/or named-pipe connection 361, virtualized site with multiple servers and same IP address 360, NT4.0 server IIS 4.0 web account server 358, NT4.0 server IIS 4.0 web account server 359. Blocks 352 and 353 may be virtualized ports with the same IP address. If the main database fails, re-ARP to get to the other server.

FIG. 7 shows a block diagram of database in this system, according to an embodiment of the invention. This figure shows how information is replicated from the main database to the regional database and how that information is made available to the local sites. The existence and status of messages in a user's account is stored in the database. Voice messages, stored as an attachment to e-mail, are sent to all of the DSSs on a user's distribution list. To check for messages, the regional database associated with the checking server is queried for an account message status. All the messages, no matter what their state, are reflected in the database. The main database information is replicated, after a time delay in the regional database. After messages are detected in the database, the DSS from which the messages will be retrieved is checked to see if messages are yet present. This is done before reporting the presence of messages to the user. After a session in which messages are deleted, a control package is sent to every DSS on the user's distribution list. The status is also updated in the regional database. Deleted message information is maintained in the database for the length of time it takes for an unused DSS to fall off the distribution list. Messages are deleted at a DSS when the control package to delete the messages is received at the DSS. At that time, the checking phone or web server deletes messages that are timestamped as deleted.

FIG. 7 includes site 400, site 407, regional data center supporting phone servers and web messaging servers 427, regional data center supporting phone servers and web messaging servers 423, main data center including regional database supporting phone servers and web message servers and web servers 413. FIG. 7 includes a phone server which is a three-tier application architecture with 24–96 users per phone, three persistent database connections per phone server and fail-over to enabling regional data center. Site 400 includes web message server 401, phone server 402 with T1 24 voice channels 404 and 405 and phone server NT403 with T1 24 voice channels 406. Site 407 includes phone server 410 with T1 voice channels 408 and 409 and phone server 412 with voice channels 411. Main data center including a regional database supporting phone servers and web message servers and web servers 413 includes replicated user tables, replicated systems tables and local web tables 414, web account servers (BG415 and 416), database publisher 417, main database mirror 419 and main database 420. Also, shown as replication of LANs system and user tables 418, replication of internet system and user tables 422 and system and user tables to publisher 421. Regional data center supporting phone servers and web messaging servers 423 include replicated user tables replicated system tables and local web tables 424. Also shown is temporary connection for account not yet replicated 429, ten persistent connections per web connection server 430, three persistent connections per phone server 431, temporary connection for account not yet replicated 426, replication over internet system and user tables 425 and three persistent connections per phone server 433. Regional data center supporting phone servers and web message servers 427 includes replicated user tables replicated system tables and local web tables 428.

Store and forward is used for communication between the various components of the system according to one embodiment of the invention. Such store and forward is implemented via e-mail in one example of the system. The voice-mail is sent in a voice-mail package (VMP) e-mail, which has two attachments, the voice message data and a header file describing the message. The header may contain information such as whether the message was user-originated, broadcast, advertisement store based, new, or saved. The message header may contain an authentication for spam rejection. The body of the message contains a recipient list and message specific data such as a message ID, message type, sender's caller ID, sender's caller ID name, sender's group, sender's first name, sender's last name, duration of message, file compression type, and authentication string. The voice message data may be stored in a real audio 8.5V compression. Alternatively, or in combination with store and forward, techniques other than store and forward may be used for communication between the various components of the invention.

A DSS control package can be used to control the data storage server. It is used to change the status of a user's messages stored on the DSS and as a vehicle for changing the usage history and statistics of an account. Such information is stored in the user's account in each DSS on the user's distribution list. The phone server or web message server sends a control package to each DSS on the user's distribution list after the user's session is complete. Message status changes and usage updates for the session are reflected in the control package. Usage history includes advertisements listened to and recipients sent to.

Other e-mails may be sent within the system for various control and communication purposes. For example, an outbound delivery package e-mail may be sent. Such an e-mail is sent to an outbound account for a site at the DSS used for outbound message forwarding by any phone server at the target site. When a phone server has lines available to call out on, it checks the outbound DSS specified for that site.

When it finds a message it can deliver, it changes the extension for that file from out to phone server name in order to "grab the token." Checks are made to make sure that other phone servers have not already taken the message. Next, a telephone call is made based on the message. An advertisement package e-mail may be sent. Such an e-mail is sent to various phone servers and contains advertisement specific data and voice data containing the advertisement message. Greetings may also be sent by e-mail.

FIG. 8 shows a typical local site, according to an embodiment of the invention. Such a local site may contain a series of phone servers each of which receive a series of incoming voice channels, as shown here T1 incoming voice lines. In one example of the system, ISDN PRI (primary rate interface) is used, which includes 23 bearer channels and one data channel per T1. The data channel contains additional information, such as the party that the person called, original called party (OCN). Equipment for such a local site as shown in FIG. 8 may be located at a central office. According to another embodiment of the invention, such equipment is located at an Internet service provider (ISP). FIG. 8 includes 40.8 voice T1s 450, 10.2 phone servers 451, 2.7 DSS servers 452, 1.7 web message servers 453, 0.01 web servers 454, 0.007 web redirection servers 455, 0.03 regional database 456, 0.01 main database 457, 0.03 DNS servers 458, switch 482, UPS 481, ISP 484, SNTP 485 and T1 23 channels 469. FIG. 8 shows exemplary phone servers 459–468, DSSs 470–472 and web message servers 473 and 474. Also shown are exemplary web account server 476, web redirection server 477, regional database 478, main database 479 and DNS server 480. The numbers before the respective item represent factional machine counts which are pro-rated averages among sites, for example, the 40.8 voice T1s. The site is designed to handle 67,000 users. DSS traffic is estimated at 19.6 Gbytes per day. DSS/SNTP are shared on the same machine for small sites. Potential multi-home DSS/SNTP service machines are used. LAN traffic is estimated at 47 Gbytes per day. 2.5 T1s are estimated on average for internet traffic 483. Fifteen machines and 15 IP numbers are estimated to be used for the system shown in FIG. 8.

Figure 9:
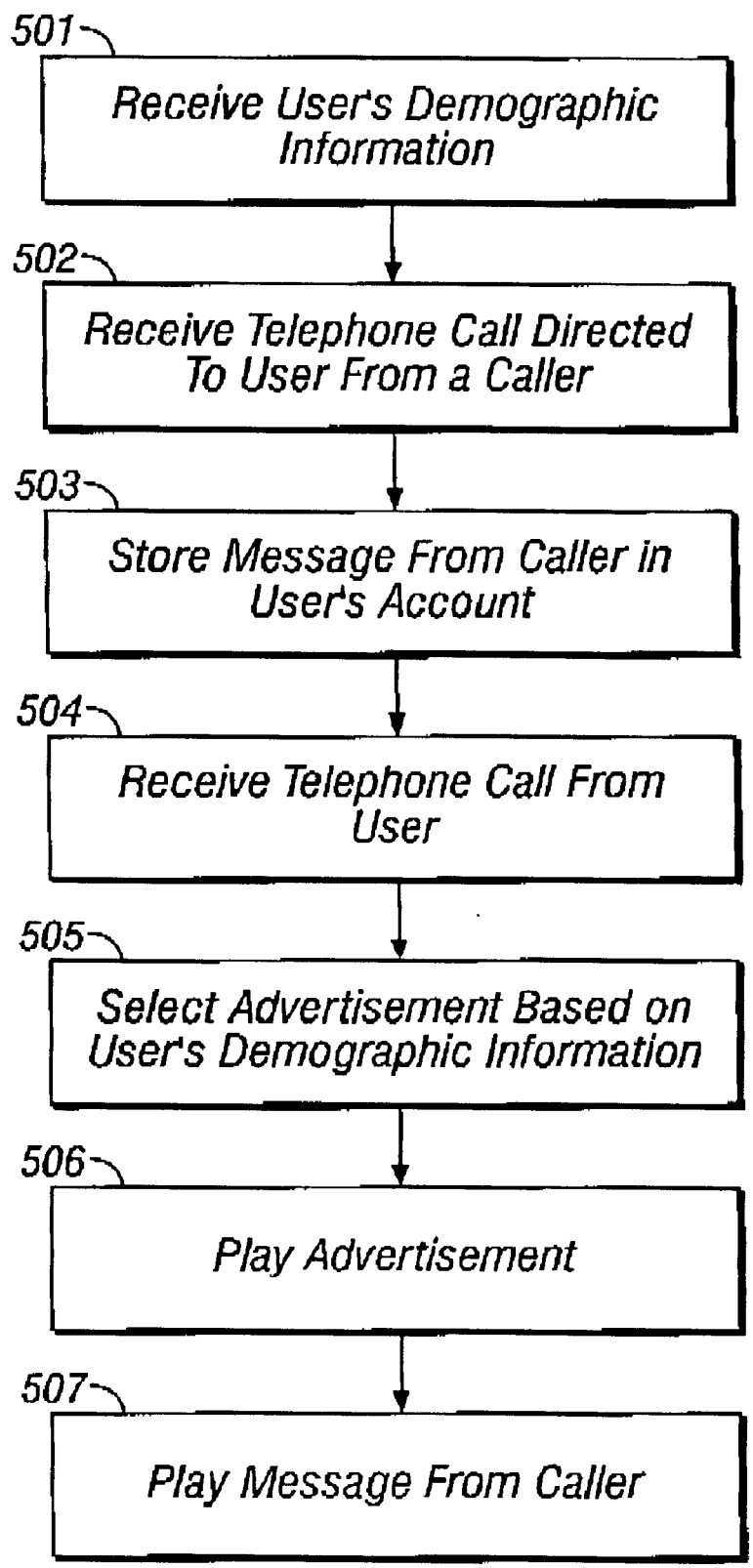
FIG. 9 shows a flow diagram of selecting and playing a message not left by a caller based on information about the user.

FIG. 9 shows a flow diagram of selecting and playing a message not left by a caller based on information about the user. First receive user's demographic information (block 501). Such information may be received during the registration process or may be obtained at other times. In lieu of or in addition to demographic information, other information regarding the user may be used in such a process, for example, information regarding the user's use of the system. Next, receive a telephone call directed to the user from a caller (block 502). A message is stored from the caller in the user's account (block 503). A telephone call may be received from the user (block 504). An advertisement is selected based on the user's demographic information (block 505). The advertisement is played (block 506). Next, a message is played from the caller (block 507). Thus, a non-system message such as an advertisement may be played to the user based on information regarding the user such as demographic information. Additionally, the system may play system messages to the user, such as information regarding the number of voice mail messages for the user, system options or help.

The foregoing description of various embodiments of the invention has been presented for purposes of illustration and description. It is not intended to limit the invention to the precise forms disclosed. Many modifications and equivalent arrangements will be apparent.

What is claimed is:

1. A voice messaging system comprising:
   logic that receives and stores a voice message from a caller for a respective user;
   logic that selects for the user a non-system message not left by a caller to a user, the non-system message selected based on information about the user; and
   logic that plays the non-system message to the user while the stored voice message is retrieved.

2. The voice messaging system of claim 1, wherein the message not left by a caller comprises an advertisement.

3. The voice messaging system of claim 1, wherein the message not left by a caller comprises a message dynamically created.

4. The voice messaging system of claim 3, wherein the message not left by a caller comprises information regarding current weather conditions.

5. The voice messaging system of claim 1, wherein the information about the user comprises demographic information.

6. The voice messaging system of claim 1, wherein the information about the user comprises sex, age, and location of residence.

7. The voice messaging system of claim 1, wherein the information about the user comprises information regarding the current location of the user.

8. The voice messaging system of claim 7, wherein the information regarding the location of the user is obtained by determining the location of the cellular phone from which the user is calling.

9. The voice messaging system of claim 7, wherein the information regarding the location of the user is obtained from input by the user while making the current telephone call to the system.

10. The voice messaging system of claim 1, wherein the information about the user comprises data collected from the user over a telephone keypad.

11. The voice messaging system of claim 1, wherein the information about the user comprises data collected from the user by way of the voice of the user.

12. The voice messaging system of claim 1, wherein the information about the user comprises data collected from the user over a website.

13. The voice messaging system of claim 1, wherein the information about the user comprises information regarding the user's use of the system.

14. The voice messaging system of claim 1, wherein the information about the user comprises information regarding the user's response to prior messages not left by a caller to the user.

15. The voice messaging system of claim 1, wherein the information about the user comprises information regarding the user's response to advertisements.

16. The voice messaging system of claim 1, further comprising logic that allows the user to place a telephone call by making a selection based on a message not left by a caller to the user.

17. The voice messaging system of claim 1, further comprising logic that allows the user to make a selection after play of at least part of the message not left by a caller to the user, the selection controlling later play of the message not left by a caller to the user, or play of subsequent message not left by a caller to the user.

18. The voice messaging system of claim 1, further comprising logic that provides additional information, other than messages left by a caller, to the user in response to a request from the user.

19. The voice messaging system of claim 18, wherein the additional information is selected from among information regarding: user directory, system product and service information, anniversary reminders, birthdate reminders, time, stock quotes, flowers, hotels, airlines, car rental, reverse telephone lookup, location of the area code, provide caller ID and long distance services.

20. The voice messaging system of claim 18, wherein the additional information comprises information related to a product or service that the user may purchase.

21. The voice messaging system of claim 18, wherein the request comprises a set of keystrokes on a touch-tone telephone keypad that correspond to letters in the name of the respective information.

22. A voice messaging system comprising:
- logic that receives and stores a message from a caller for a respective user;
- logic that selects an advertisement for the user, the advertisement selected based on information about the user; and
- logic that plays the advertisement to the user while the stored message is retrieved.

23. The voice messaging system of claim 22, wherein the information about the user comprises demographic information.

24. The voice messaging system of claim 22, wherein the information about the user comprises sex, age, and location of residence.

25. The voice messaging system of claim 22, wherein the information about the user comprises information regarding the current location of the user.

26. The voice messaging system of claim 25, wherein the information regarding the location of the user is obtained by determining the location of the cellular phone from which the user is calling.

27. The voice messaging system of claim 25, wherein the information regarding the location of the user is obtained from input by the user while making the current telephone call to the system.

28. The voice messaging system of claim 22, wherein the information about the user comprises data collected from the user over a telephone keypad.

29. The voice messaging system of claim 22, wherein the information about the user comprises data collected from the user by way of the voice of the user.

30. The voice messaging system of claim 22, wherein the information about the user comprises data collected from the user over a website.

31. The voice messaging system of claim 22, wherein the information about the user comprises information regarding the user's use of the system.

32. The voice messaging system of claim 22, wherein the information about the user comprises information regarding the user's response to prior advertisements.

33. The voice messaging system of claim 22, further comprising logic that allows the user to place a telephone call by making a selection based on the advertisement.

34. The voice messaging system of claim 22, further comprising logic that allows the user to place a call to the advertiser by selecting a key on the telephone.

35. The voice messaging system of claim 22, further comprising logic that allows the user to make a selection after play of at least part of an advertisement, the selection controlling later play of the advertisement or other advertisements.

36. The voice messaging system of claim 22, further comprising logic that allows the user to cause a reminder message to be left to the user in the future.

37. The voice messaging system of claim 36, wherein the reminder message is delivered by a telephone call to the user.

38. The voice messaging system of claim 36, wherein the reminder message is delivered to the user by e-mail.

39. The voice messaging system of claim 36, wherein the reminder message includes an offer for a product or service associated with the reminder.

40. The voice messaging system of claim 22, further comprising:
- a set of geographically distributed devices in which voice messages are stored; and
- logic that causes voice messages to be stored in at least a device in the set of devices, the device one from which messages can be efficiently retrieved by the user who is in a location from which the user is likely to retrieve messages.

* * * * *

UNITED STATES PATENT AND TRADEMARK OFFICE
CERTIFICATE OF CORRECTION

| | | |
|---|---|---|
| PATENT NO. | : 6,603,838 B1 | |
| APPLICATION NO. | : 09/584242 | |
| DATED | : August 5, 2003 | |
| INVENTOR(S) | : Brown et al. | |

It is certified that error appears in the above-identified patent and that said Letters Patent is hereby corrected as shown below:

Corrections to the Drawings

In FIG. 1A, Please add the following note located below elements 40-44:
--OTHER FUTURE CHOICES
  4: Play messages slower
  6: Play messages faster
  7: Go back - 5 secs
  8: Skip forward - 5 secs
  0: Other lesser used choices:
    • Tell me details about this sender
    • Put this sender on my priority list
    • Play other messages from this sender
    • Help--

In FIG. 1A, Please add the following note and lead arrow pointing toward element 44:
--Abort -
make no effect
on this message.
Go back up
one level.--

Figure 1B:
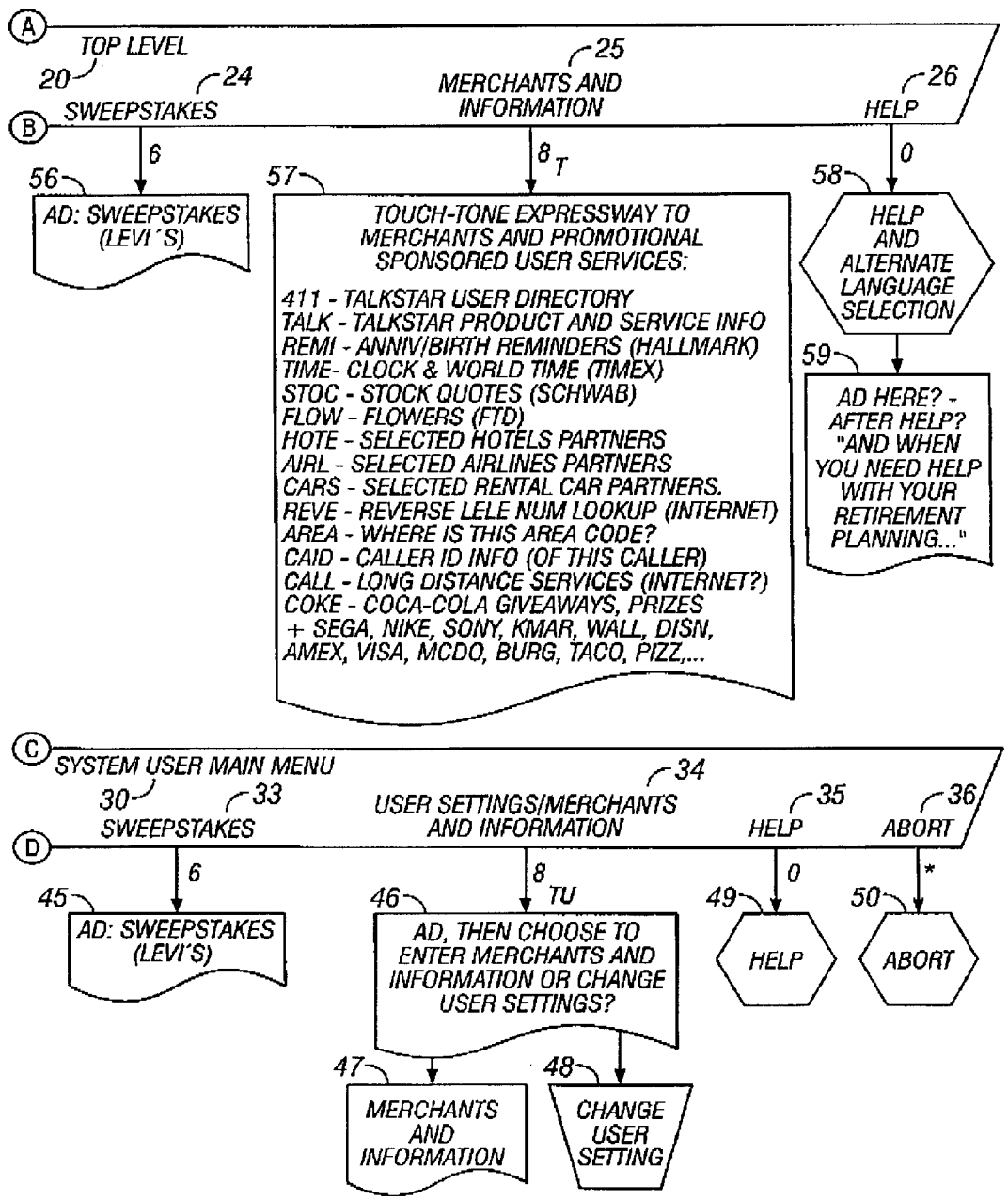

On FIG. 1B, in element 57, please replace
"REVE – REVERSE LELE NUM LOOKUP (INTERNET)"
with
--REVE – REVERSE TELE. NUM LOOKUP (INTERNET)--

In FIG. 5, please add the following legend to the upper portion of the Figure:
--Phone Server Main State Diagram--

In FIG. 5, please add the following legend to the upper portion of the Figure:
--State Diagram of the Phone Server Primary User Interface--

In FIG. 5, please add the following legend to the upper portion of the Figure:
--State: Hello--

UNITED STATES PATENT AND TRADEMARK OFFICE
CERTIFICATE OF CORRECTION

| | |
|---|---|
| PATENT NO. | : 6,603,838 B1 |
| APPLICATION NO. | : 09/584242 |
| DATED | : August 5, 2003 |
| INVENTOR(S) | : Brown et al. |

It is certified that error appears in the above-identified patent and that said Letters Patent is hereby corrected as shown below:

Corrections to the Drawings

In FIG. 5, please add the following legend to the lower portion of the Figure:
--CPN - Calling Party Number
(Caller ID)
OCN - Original Called Party
CDN - Called Number
RFCF - Reason for Call Forward--

In FIG. 5, please add the following legend to the lower portion of the Figure:
--Global: Hang up after 60 minute
maximum session time.--

In FIG. 5, Please add the following note next to element 311:
--Note: Not Account Number--

In FIG. 6, please add the following legend to the upper portion of the Figure:
--MAIN DATABASE CLUSTER--

Figure 7A:
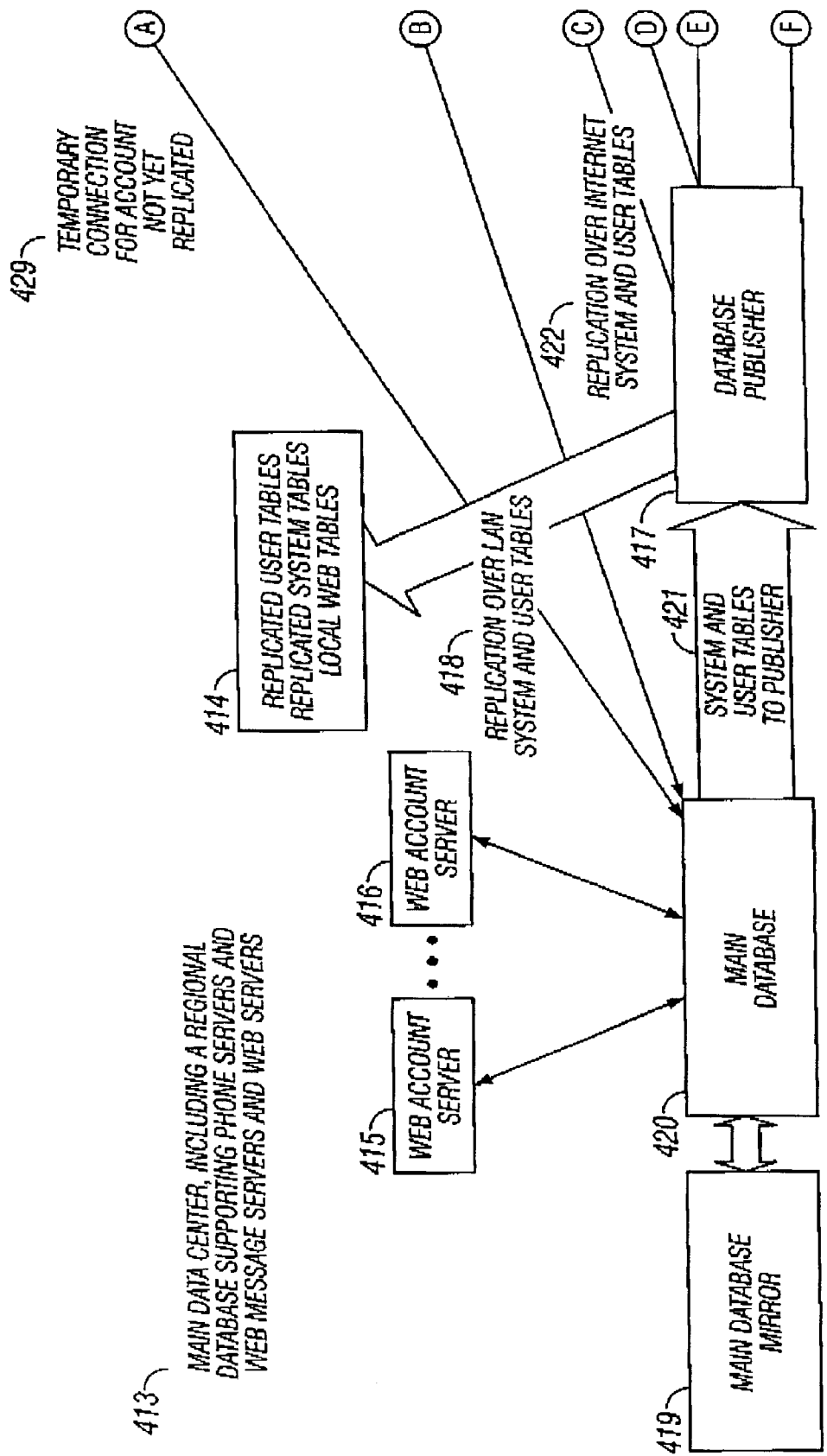
FIG. 7 shows a block diagram of database in this system, according to an embodiment of the invention.

In FIG. 7A, please add the following legend to the upper portion of the Figure:
--DATABASE CONNECTION ARCHITECTURE--

Figure 7B:
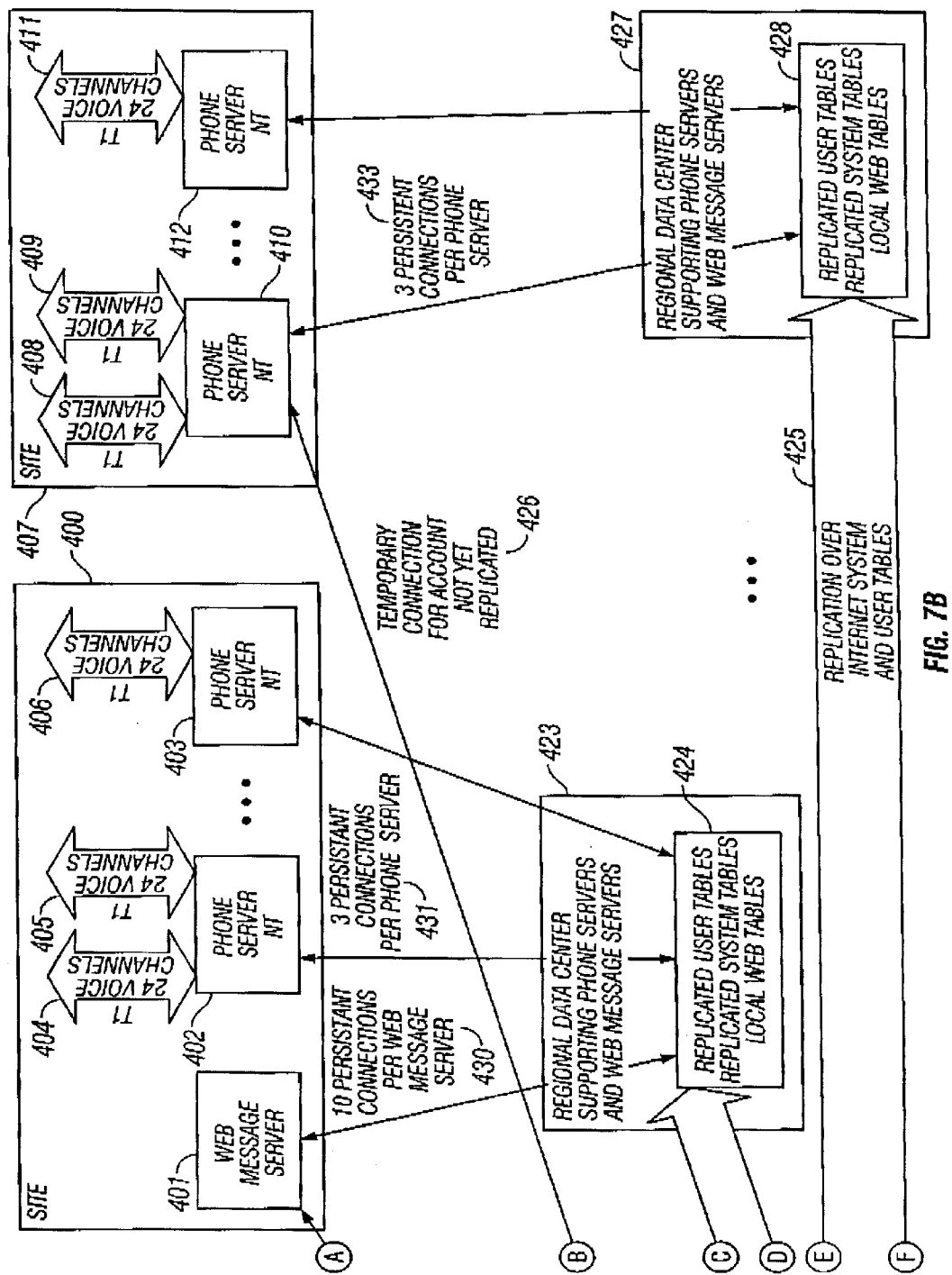

In FIG. 7B, please add the following legend to the upper portion of the Figure:
--PHONE SERVER
Three-tier application architecture 24-96 users per phone server, 3 persistent database connections per phone server. Failover to neighbor Regional Data Center--

Figure 8A:
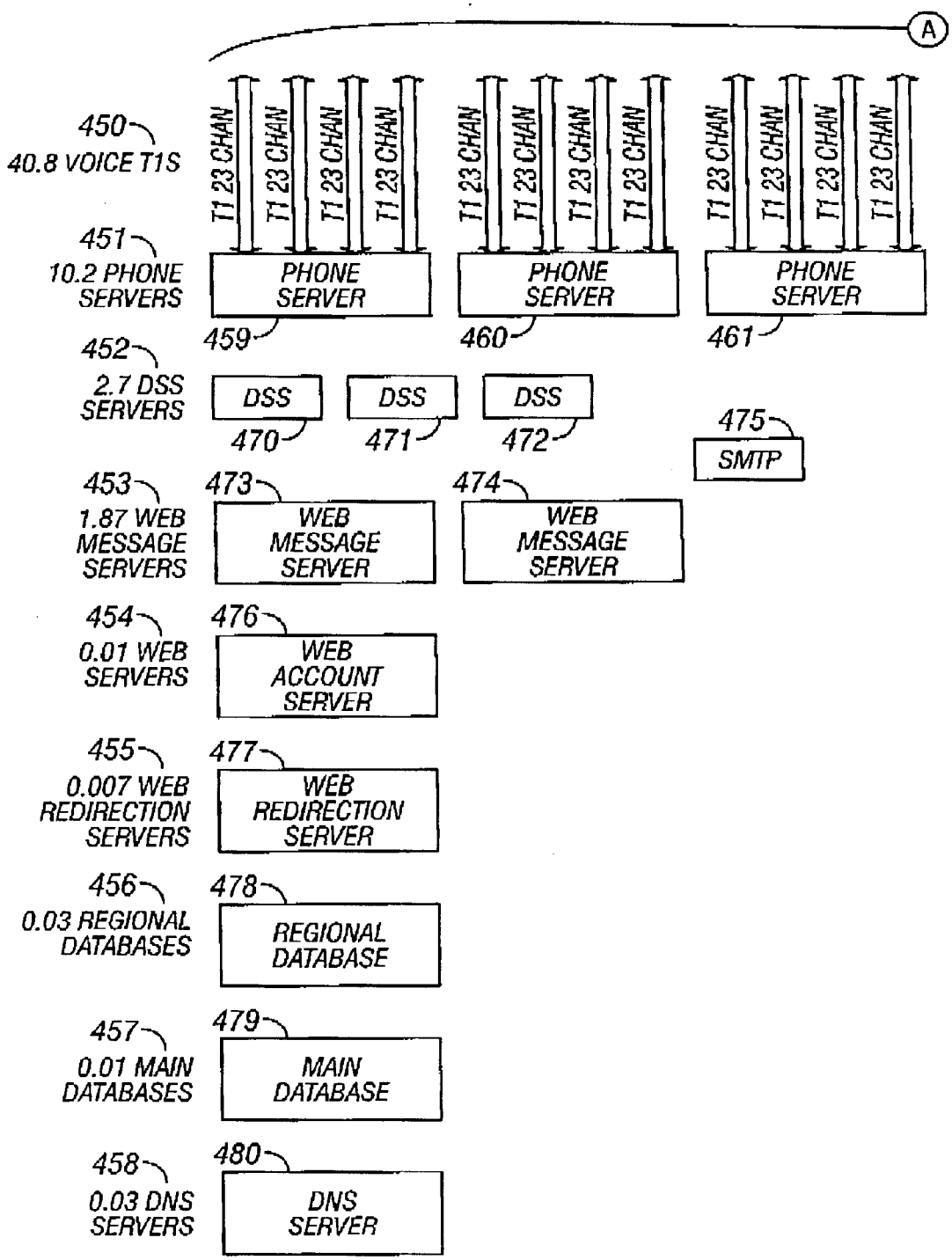
FIG. 8 shows a typical local site, according to an embodiment of the invention.

In FIG. 8A, please add the following legend to the upper portion of the Figure:

--Typical TalkStar Site--

In FIG. 8A, please add the following legend to the upper portion of the Figure:

--This represents a typical, fully utilized site. This site is capable of handling peak loads. Fractional machine counts are pro-rated averages among all sites.--

UNITED STATES PATENT AND TRADEMARK OFFICE
CERTIFICATE OF CORRECTION

PATENT NO. : 6,603,838 B1
APPLICATION NO. : 09/584242
DATED : August 5, 2003
INVENTOR(S) : Brown et al.

It is certified that error appears in the above-identified patent and that said Letters Patent is hereby corrected as shown below:

Corrections to the Drawings

Figure 8B:
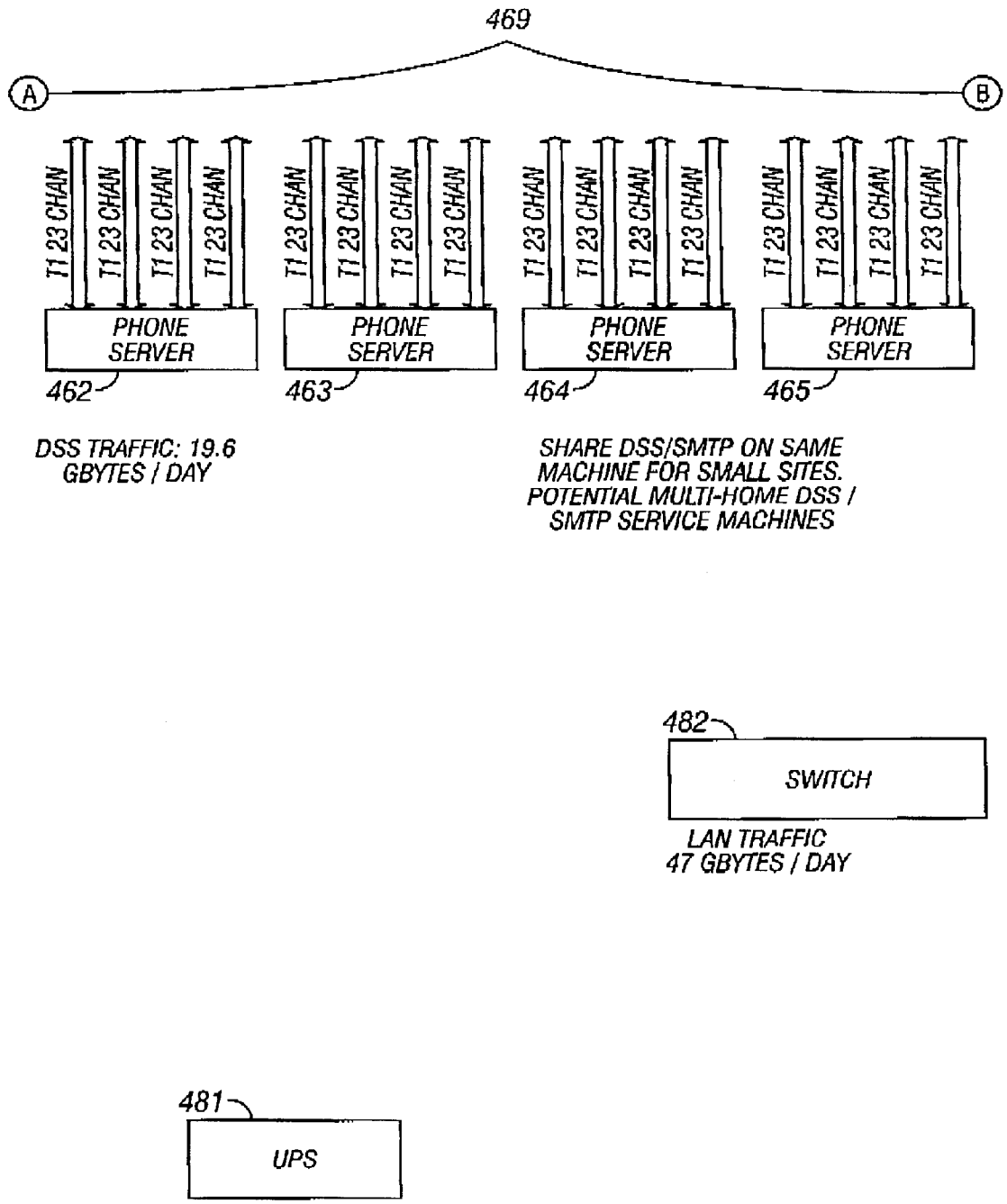

In FIG. 8B, please add the following note above reference character 469:
--THIS SITE CAN HANDLE 67,000 USERS--

Figure 8C:
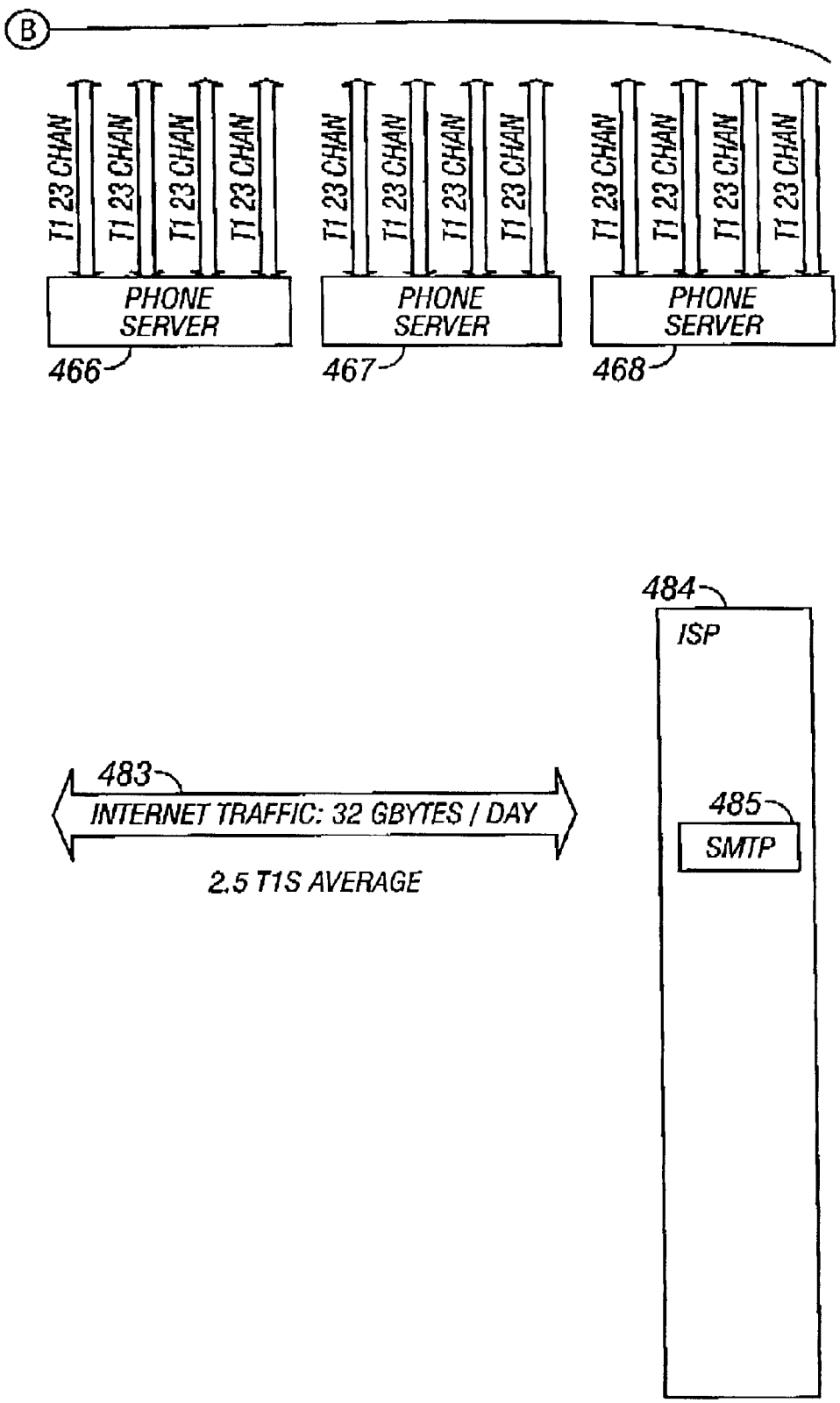

In FIG. 8C, please add the following note to the lower portion of the Figure:
--15 machines
15 IP numbers--

Correction to Specifications

On column 2, line 28, after "FIG. 1" and before "is a flow diagram that shows", please insert --, comprising FIG. 1A and FIG. 1B,--.

Figure 3A:
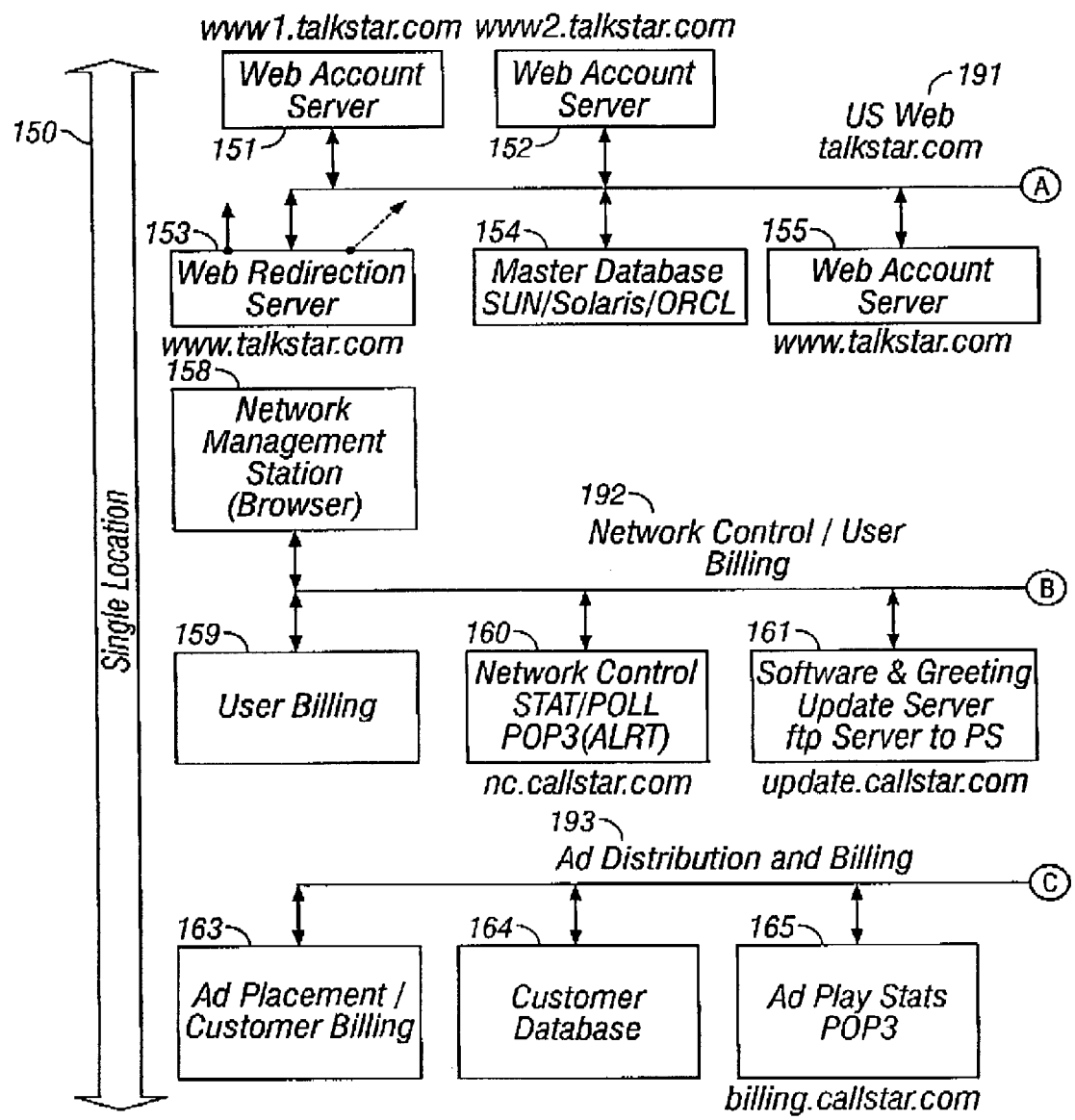
FIG. 3 shows a more detailed block diagram of the system, according to an embodiment of the invention.
Figure 3B:
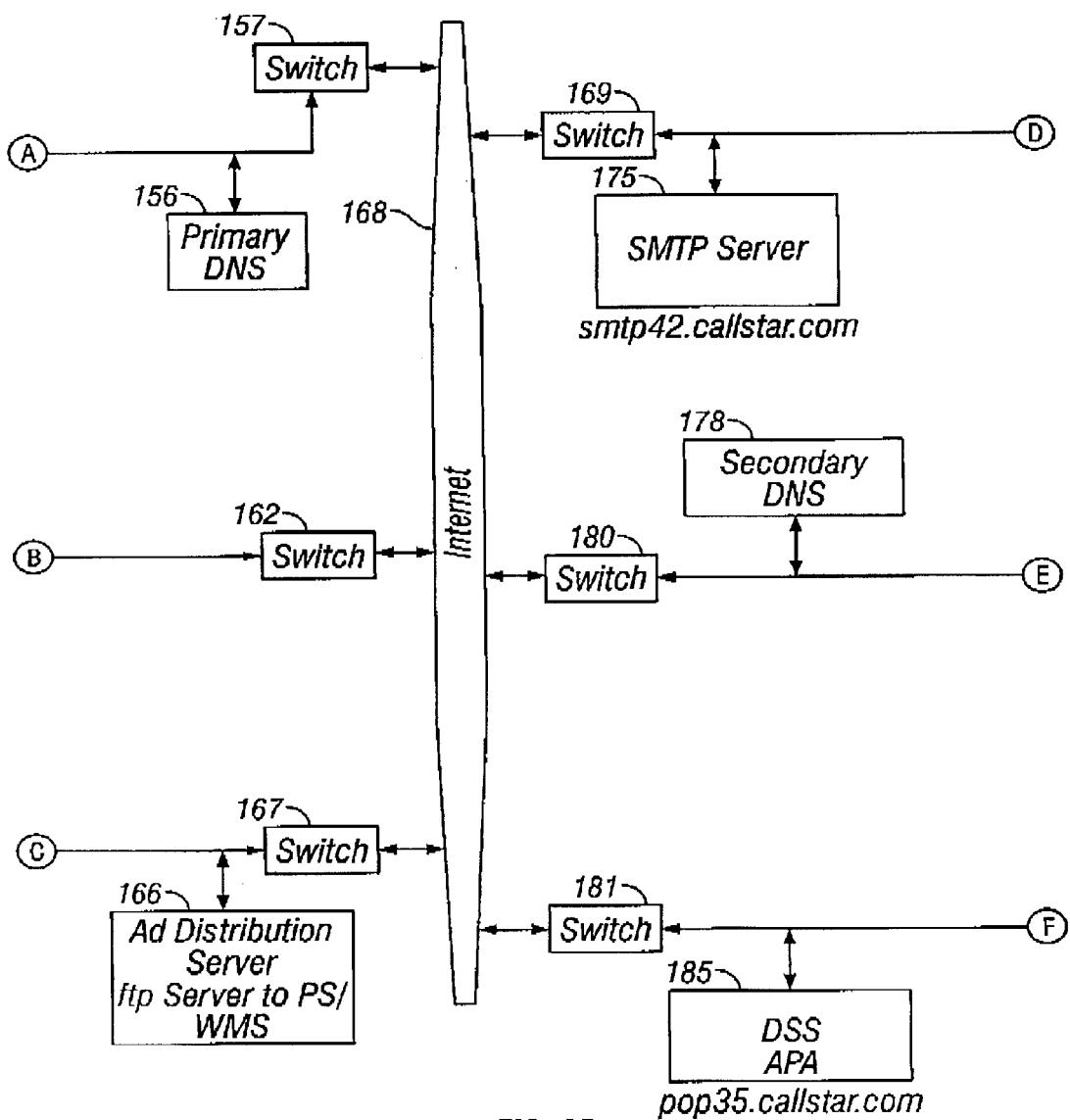
Figure 3C:
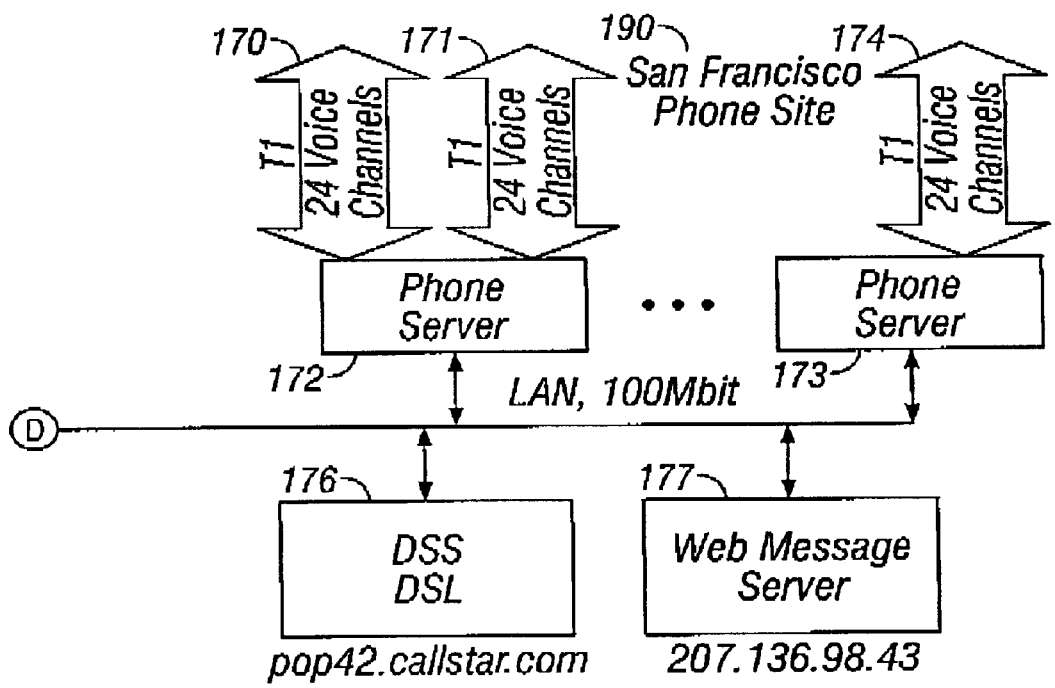
Figure 3C:
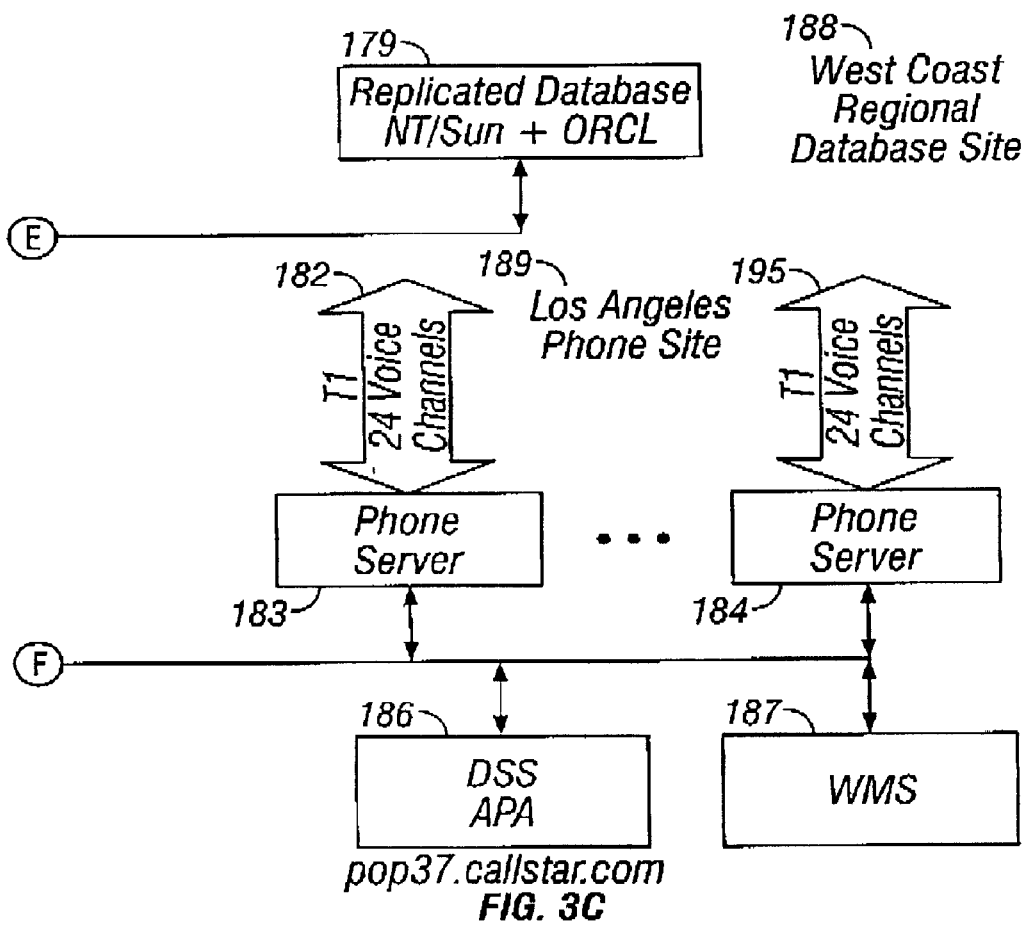

On column 2, line 33, after "FIG. 3" and before "shows a more detailed block diagram", please insert --, comprising FIG. 3A, FIG. 3B, and FIG. 3C,--.

Figure 4A:
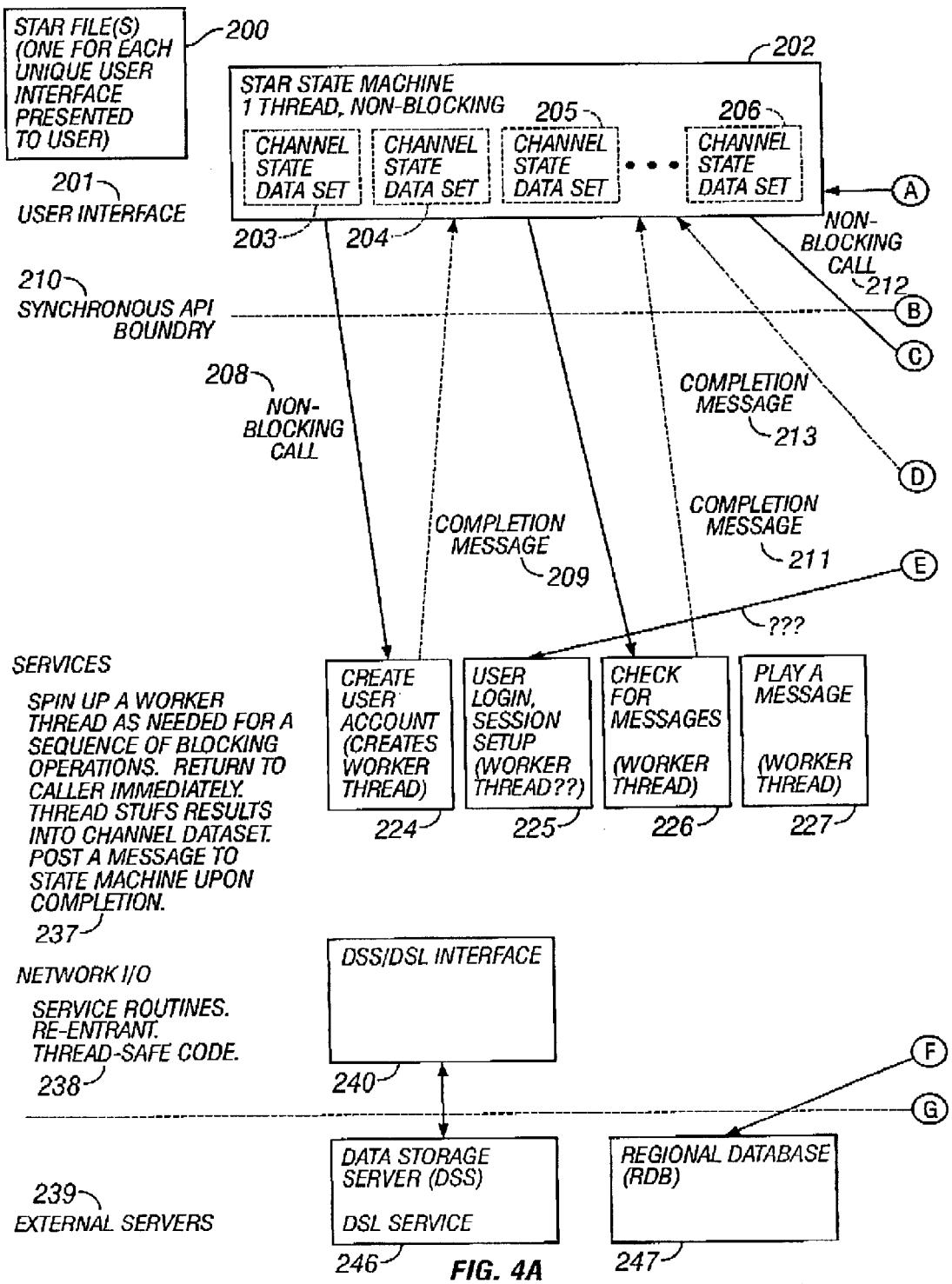
FIG. 4 shows a phone server software structure, according to an embodiment of the invention.
Figure 4B:
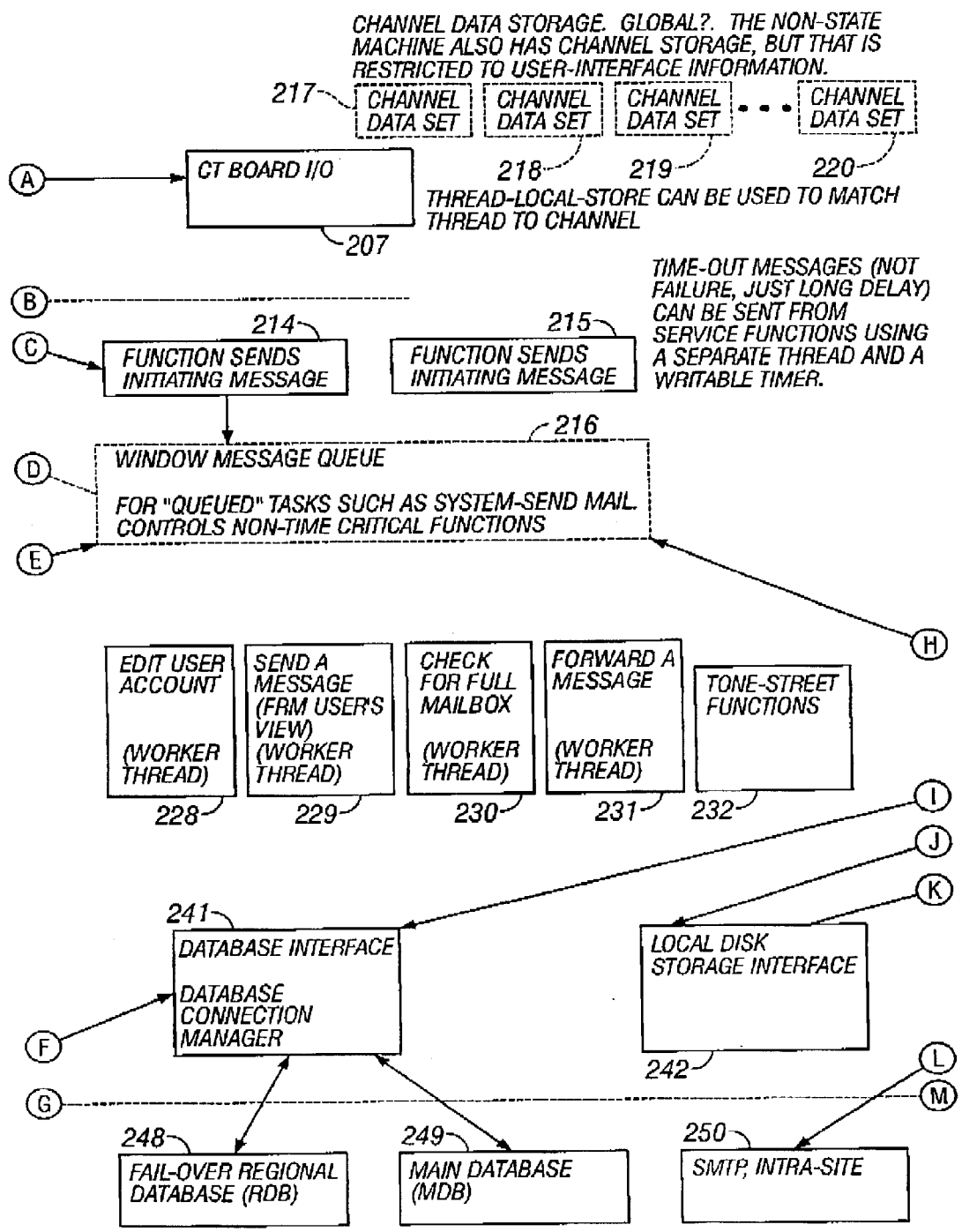
Figure 4C:
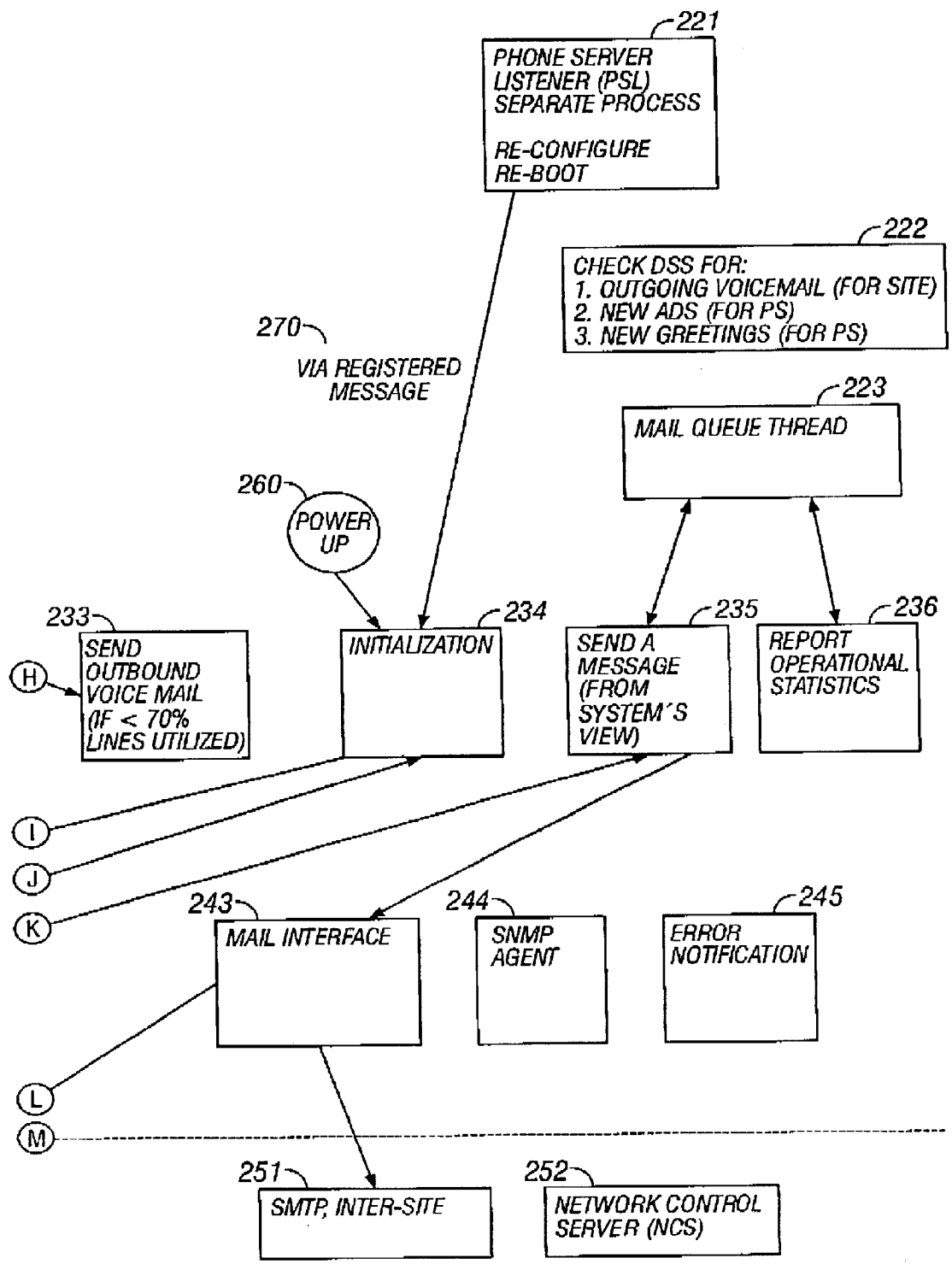

On column 2, line 35, after "FIG. 4" and before "shows a phone server software structure", please insert --, comprising FIG. 4A, FIG. 4B, and FIG. 4C,--.

On column 2, line 42, after "FIG. 7" and before "shows a block diagram of database", please insert --, comprising FIG. 7A and FIG. 7B,--.

On column 2, line 44, after "FIG. 8" and before "shows a typical local site", please insert --, comprising FIG. 8A, FIG. 8B, and FIG. 8C,--.

On column 10, line 39, after "FIG. 1" and before "is a flow diagram that shows", please insert --, comprising FIG. 1A and FIG. 1B,--.

On column 12, line 64, after "FIG. 3" and before "shows a more detailed block diagram", please insert --, comprising FIG. 3A, FIG. 3B, and FIG. 3C,--.

On column 16, line 4, after "FIG. 4" and before "shows a phone server software structure", please insert --, comprising FIG. 4A, FIG. 4B, and FIG. 4C,--.

UNITED STATES PATENT AND TRADEMARK OFFICE
CERTIFICATE OF CORRECTION

| | |
|---|---|
| PATENT NO. | : 6,603,838 B1 |
| APPLICATION NO. | : 09/584242 |
| DATED | : August 5, 2003 |
| INVENTOR(S) | : Brown et al. |

It is certified that error appears in the above-identified patent and that said Letters Patent is hereby corrected as shown below:

Corrections to the Specifications

On column 17, line 39, after "FIG. 7" and before "shows a block diagram of database", please insert --, comprising FIG. 7A and FIG. 7B,--.

On column 19, line 10, after "FIG. 8" and before "shows a typical local site", please insert --, comprising FIG. 8A, FIG. 8B, and FIG. 8C,--.

Corrections to the Claims

On column 20, lines 2-17, please replace Claims 1-4 with the following Claims 1-4:

1. A voice messaging system comprising:
    logic that receives and stores a voice message from a caller for a respective user;
    logic that selects a message for the user other than the voice message, the selected message based on information about the user; and
    logic that plays the selected message to the user while the stored voice message is retrieved.

2. The voice messaging system of claim 1, wherein the selected message comprises an advertisement.

3. The voice messaging system of claim 1, wherein the selected message comprises a message dynamically created.

4. The voice messaging system of claim 1, wherein the selected message comprises information regarding current weather conditions.

On column 20, lines 47-50, please replace Claim 14 with the following Claim 14:

14. The voice messaging system of claim 1, wherein the information about the user comprises information regarding the user's response to prior selected messages.

UNITED STATES PATENT AND TRADEMARK OFFICE
CERTIFICATE OF CORRECTION

| | | |
|---|---|---|
| PATENT NO. | : 6,603,838 B1 | |
| APPLICATION NO. | : 09/584242 | |
| DATED | : August 5, 2003 | |
| INVENTOR(S) | : Brown et al. | |

It is certified that error appears in the above-identified patent and that said Letters Patent is hereby corrected as shown below:

On column 20, lines 54-63, please replace Claims 16-17 with the following Claims 16-17:

16. The voice messaging system of claim 1, further comprising logic that allows the user to place a telephone call by making a selection based on the selected message.

17. The voice messaging system of claim 1, further comprising logic that allows the user to make a selection after play of at least part of the selected message, the selection controlling later play of the selected message, or play of a subsequent selected message.

Signed and Sealed this

Seventeenth Day of June, 2008

JON W. DUDAS
*Director of the United States Patent and Trademark Office*